United States Patent
Kang et al.

(10) Patent No.: US 10,531,115 B2
(45) Date of Patent: *Jan. 7, 2020

(54) METHOD FOR ENCODING/DECODING IMAGES, AND APPARATUS USING SAME

(71) Applicant: Electronics and Telecommunications Research Institute, Daejeon (KR)

(72) Inventors: Jung Won Kang, Daejeon (KR); Ha Hyun Lee, Seoul (KR); Jin Ho Lee, Daejeon (KR); Jin Soo Choi, Daejeon (KR); Jin Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,036

(22) Filed: Oct. 29, 2018

(65) Prior Publication Data

US 2019/0068990 A1 Feb. 28, 2019

Related U.S. Application Data

(63) Continuation of application No. 14/650,184, filed as application No. PCT/KR2013/012135 on Dec. 24, 2013, now Pat. No. 10,154,278.

(30) Foreign Application Priority Data

Dec. 26, 2012 (KR) .................. 10-2012-0153421
Apr. 12, 2013 (KR) .................. 10-2013-0040658
(Continued)

(51) Int. Cl.
*H04N 19/52* (2014.01)
*H04N 19/30* (2014.01)
(Continued)

(52) U.S. Cl.
CPC .......... *H04N 19/52* (2014.11); *H04N 19/187* (2014.11); *H04N 19/30* (2014.11); *H04N 19/31* (2014.11);
(Continued)

(58) Field of Classification Search
None
See application file for complete search history.

(56) References Cited

U.S. PATENT DOCUMENTS

2006/0233243 A1 10/2006 Ridge et al.
2007/0086521 A1 4/2007 Wang et al.
(Continued)

FOREIGN PATENT DOCUMENTS

KR 1020060068254 A 6/2006
KR 1020060122664 A 11/2006
(Continued)

OTHER PUBLICATIONS

"Advanced video coding for generic audiovisual services", ITU-T SG16 Meeting, Mar. 14-25, 2011, pp. 1-21, Geneva.
(Continued)

*Primary Examiner* — Rebecca A Volentine
(74) *Attorney, Agent, or Firm* — William Park & Associates Ltd.

(57) ABSTRACT

According to the present invention, an image decoding method for supporting a plurality of layers includes the steps of: receiving and parsing layer-dependent information for reference layers that can be referenced by a current layer in an entire bitstream; when interlayer prediction is used in decoding a current picture in the current layer, receiving and parsing layer information for a reference layer referenced by the current picture among the reference layers; and decoding the current picture on the basis of the layer information.

6 Claims, 8 Drawing Sheets

(30) Foreign Application Priority Data

| Jun. 21, 2013 | (KR) | 10-2013-0071844 |
|---|---|---|
| Jul. 15, 2013 | (KR) | 10-2013-0083101 |
| Dec. 24, 2013 | (KR) | 10-2013-0162524 |

(51) Int. Cl.

| H04N 19/187 | (2014.01) |
|---|---|
| H04N 19/50 | (2014.01) |
| H04N 19/70 | (2014.01) |
| H04N 19/593 | (2014.01) |
| H04N 19/597 | (2014.01) |
| H04N 19/503 | (2014.01) |
| H04N 19/33 | (2014.01) |
| H04N 19/31 | (2014.01) |
| H04N 19/34 | (2014.01) |
| H04N 19/36 | (2014.01) |

(52) U.S. Cl.

CPC ............. *H04N 19/33* (2014.11); *H04N 19/34* (2014.11); *H04N 19/36* (2014.11); *H04N 19/50* (2014.11); *H04N 19/503* (2014.11); *H04N 19/593* (2014.11); *H04N 19/597* (2014.11); *H04N 19/70* (2014.11)

(56) References Cited

U.S. PATENT DOCUMENTS

| 2008/0232476 | A1 | 9/2008 | Jeon et al. | |
|---|---|---|---|---|
| 2008/0304566 | A1 | 12/2008 | Yoon et al. | |
| 2009/0041130 | A1 | 2/2009 | Yoon et al. | |
| 2009/0274214 | A1 | 11/2009 | Yoon et al. | |
| 2010/0142613 | A1 | 6/2010 | Zhu | |
| 2011/0122945 | A1 | 5/2011 | Li et al. | |
| 2012/0183077 | A1 | 7/2012 | Hong et al. | |
| 2012/0230431 | A1 | 9/2012 | Boyce et al. | |
| 2013/0010863 | A1 | 1/2013 | Wu et al. | |
| 2013/0182755 | A1 | 7/2013 | Chen et al. | |
| 2013/0195201 | A1 | 8/2013 | Boyce et al. | |
| 2013/0208792 | A1 | 8/2013 | He et al. | |
| 2013/0243081 | A1* | 9/2013 | Chen | H04N 19/597 375/240.02 |
| 2014/0010291 | A1 | 1/2014 | He et al. | |
| 2014/0092977 | A1 | 4/2014 | Lainema et al. | |
| 2014/0177718 | A1 | 6/2014 | Rusert | |
| 2014/0181885 | A1 | 6/2014 | Rusert | |
| 2014/0301456 | A1* | 10/2014 | Wang | H04N 19/70 375/240.12 |
| 2015/0201203 | A1 | 7/2015 | Hendry et al. | |
| 2015/0264377 | A1* | 9/2015 | He | H04N 19/30 375/240.12 |
| 2015/0288976 | A1 | 10/2015 | Hendry et al. | |

FOREIGN PATENT DOCUMENTS

| KR | 1020080035220 A | 4/2008 |
|---|---|---|
| KR | 1020110033240 A | 3/2011 |
| WO | 2006123913 A1 | 11/2006 |
| WO | 2010011295 A1 | 1/2010 |
| WO | 2011081643 A2 | 7/2011 |

OTHER PUBLICATIONS

Byeongdoo Choi et al., "MV-HEVC/SHVC HLS: On inter-layer dependency signaling", Joint Collaborative Team on Video Coding (JCT-VC) of ITU-T SG 16 WP3 and ISO/IEC JTC 1/SC 29/WG 11, Oct. 23-Nov. 1, 2013, pp. 1-7, 15th Meeting: Geneva, CH.

Byeongdoo Choi et al., "MV-HEVC/SHVC HLS: On interlayer reference picture set", Joint Collaborative Team on Video Coding (JCT-VC) of ITU-T SG 16 WP3 and ISO/IEC JTC 1/SC 29/WG 11, Jul. 25-Aug. 2, 2013, pp. 1-5, 14th Meeting: Vienna, AT.

Do-Kyoung Kwon et al., "Description of scalable video coding technology proposal by Texas Instruments Inc.", Joint Collaborative Team on Video Coding (JCT-VC) of ITU-T SG16 WP3 and ISO/IEC JTC1/SC29/WG11, 11th Meeting, Oct. 10-19, 2012, Shanghai, China.

Jianle Chen, Joint Collaborative Team on Video Coding (JCT-VC) of ITU-T SG16 WP3 and ISO/IEC JTC1/SC29/WG11, "SHVC Draft Text 1", Jan. 14-23, 2013, JCTVC-L1008, 12th Meeting, Geneva, CH.

Jill Boyce et al., "NAL unit header and parameter set designs for HEVC extensions", Joint Collaborative Team on Video Coding (JCT-VC) of ITU-T SG 16 WP3 and ISO/IEC JTC 1/SC 29/WG 11, Oct. 10-19, 2012, pp. 1-8, 11th Meeting: Shanghai, CN.

Ye-Kui Wang et al., MV-HEVC/SHVC HLS: On signalling and derivation of inter-layer RPS (combining aspects of JCTVC-M0046 and JCTVC-M0269), Joint Collaborative Team on Video Coding (JCT-VC) of ITU-T SG 16 WP 3 and ISO/IEC JTC 1/SC 29/WG 11, 13th Meeting, Apr. 18-26, 2013, Incheon, Republic of Korea.

Ye-Kui Wang, Joint Collaborative Team on Video Coding (JCT-VC) of ITU-T SG 16 WP 3 and ISO/IEC JTC 1/SC 29/WG 11, "ARG9: Signaling and derivation of inter-layer RPS for HEVC 3DV and scalable extensions", Apr. 18-26, 2013, JCTVC-M0269, 13th Meeting, Incheon, KR.

Jianle Chen et al., "SHVC Draft Text 1", JCTVC-L1008, Jan. 14-23, 2013, pp. 1-30, Joint Collaborative Team on Video Coding (JCT-VC) of ITU-T SG16 WP3 and ISO/IEC JTC1/SC29/WG11, 12th Meeting, Geneva, CH.

Ye-Kui Wang et al., "AHG9: Signalling and derivation of inter-layer RPS for HEVC 3DV and scalable extensions", JCTVC-M0269, Apr. 18-26, 2013, pp. 1-5, Joint Collaborative Team on Video Coding (JCT-VC) of ITU-T SG 16 WP 3 and ISO/IEC JTC 1/SC 29/WG 11, 13th Meeting, Incheon, KR.

* cited by examiner

METHOD FOR ENCODING/DECODING IMAGES, AND APPARATUS USING SAME

BACKGROUND OF THE INVENTION

Technical Field

The present invention concerns picture encoding and decoding processes, and more specifically, to an inter-layer picture encoding/decoding method applying multiple reference layers to scalable video encoding and an apparatus thereof.

Discussion of Related Art

A recent expansion of HD (High Definition) broadcasting services nationwide and worldwide led many people to being accustomed to high resolution, high quality pictures, and accordingly, a number of organizations put their energy into development of next-generation imaging devices. Further, increasing interests in UHD (Ultra High Definition) services that may offer four times more resolution than that provided by HDTV services, as well as the HDTV services, is demanding compression technology for high-quality pictures.

For picture compression, inter-prediction technology that predicts a pixel value included in a current picture from a picture that temporally comes earlier or later, intra-prediction technology that predicts a pixel value included in a current picture using pixel information in the current picture, and entropy encoding technology in which a shorter code is assigned to a more frequent symbol while a longer code is assigned to a less frequent symbol may be adopted.

A technology for picture compression provides a constant network bandwidth in a limited hardware operation environment without considering a flexible network environment. However, a new compression technique is required to compress picture data applied to a network environment in which bandwidth varies at times, and for such purpose, a scalable video encoding/decoding method may be used.

SUMMARY OF THE INVENTION

The present invention provides a picture encoding/decoding method that may enhance encoding/decoding efficiency by effectively generating and managing a reference picture list including one or more reference layers and an apparatus of using the same.

According to an embodiment of the present invention, there are provided a picture encoding/decoding method that may generate a reference picture list including one or more reference layers in generating the reference picture list for motion estimation and motion compensation when performing inter-layer prediction and an apparatus of using the same.

According to an embodiment of the present invention, there are provided a picture encoding/decoding method that may adjust the positions of reconstructed pictures of reference layers in a reference picture list and order among reconstructed pictures of reference layers when generating a reference picture list including reconstructed pictures of reference layers and an apparatus of using the same.

According to an embodiment of the present invention, a picture decoding method supporting a plurality of layers may comprise receiving and parsing layer-dependency information on a reference layer that may be referenced by a current layer in an entire bitstream; in a case where inter-layer prediction is used for decoding a current picture in the current layer, receiving and parsing layer information on a reference layer referenced by the current picture among reference layers that are derived by the layer-dependency information; and decoding the current picture based on the layer information.

The layer-dependency information may be received, included in a video parameter set extension.

The layer information may be information on an ID of a layer of a reference picture that may be referenced by the current picture, and the layer information may be received, included in a slice header.

The picture decoding method may further comprise deriving the number of reference layers that may be referenced in the entire bitstream by the current layer based on the layer-dependency information; and if the number of reference layers is greater than 0, receiving and parsing flag information indicating whether inter-layer prediction is used for decoding the current picture in the current layer.

The picture decoding method may further comprise, if the flag information is 1, the number of reference layers is greater than 1, and all of the layers included in the entire bitstream do not use at most one reference layer, receiving and parsing inter layer reference picture count information that may specify the number of inter layer reference pictures that may be used for the inter-layer prediction of the current picture.

The layer information may be received when the number of reference layers is not the same as the number of inter layer reference pictures.

The number of inter layer reference pictures may be specified as the inter layer reference picture count information plus one.

According to another embodiment of the present invention, a picture decoding apparatus supporting a plurality of layers may comprise a parsing module configured to receive and parse layer-dependency information on a reference layer that may be referenced by a current layer in an entire bit stream, and in a case where inter-layer prediction is used for decoding a current picture in the current layer, configured to receive and parse layer information on a reference layer referenced by the current picture among reference layers that are derived by the layer-dependency information; and a decoding unit configured to decode the current picture based on the layer information.

According to an embodiment of the present invention, there are provided a picture encoding/decoding method that may enhance encoding/decoding efficiency by effectively generating and managing a reference picture list including one or more reference layers and an apparatus of using the same.

According to an embodiment of the present invention, there are provided a picture encoding/decoding method that may generate a reference picture list including one or more reference layers in generating the reference picture list for motion estimation and motion compensation when performing inter-layer prediction and an apparatus of using the same.

According to an embodiment of the present invention, there are provided a picture encoding/decoding method that may adjust the positions of reconstructed picture of reference layers and order between reference layer reconstructed pictures in a reference picture list when generating a reference picture list including reconstructed pictures of reference layers and an apparatus of using the same.

DETAILED DESCRIPTION OF EMBODIMENTS

Hereinafter, embodiments of the present invention will be described in detail with reference to the accompanying drawings. In describing the embodiments, when determined to make the gist of the invention unclear, the detailed description on the well-known configurations or functions will be omitted.

When a component is "connected to" or "coupled to" another component, the component may be directly connected or coupled to the other component, or other components may also intervene. Further, when a specific component is "included", other components are not excluded but may be included, and such configuration is also included in the scope of the invention.

The terms "first" and "second" may be used to describe various components, but the components are not limited thereto. These terms are used only to distinguish one component from another. For example, the first component may be also named the second component, and the second component may be similarly named the first component.

The constitutional parts in the embodiments are independently shown to represent different features, but this does not mean that each constitutional part is formed of a separate hardware unit or one software constitutional unit. That is, each constitutional part is separated from the others for ease of description. At least two of the constitutional parts may be combined into a single constitutional part, or one constitutional part may be divided into a plurality of constitutional parts which may perform functions, respectively. The embodiments covering the combinations of the constitutional parts or the separation thereof may be included in the scope of the invention without departing from the gist of the invention.

Some constitutional parts are not essential ones to perform the inevitable functions of the present invention but rather may be optional constitutional parts to enhance performance. The present invention may be implemented only by the constitutional parts necessary for realizing the gist of the invention or such a configuration that includes only the essential constitutional parts excluding the optional constitutional parts used for enhancing performance may also be included in the scope of the present invention.

Figure 1:
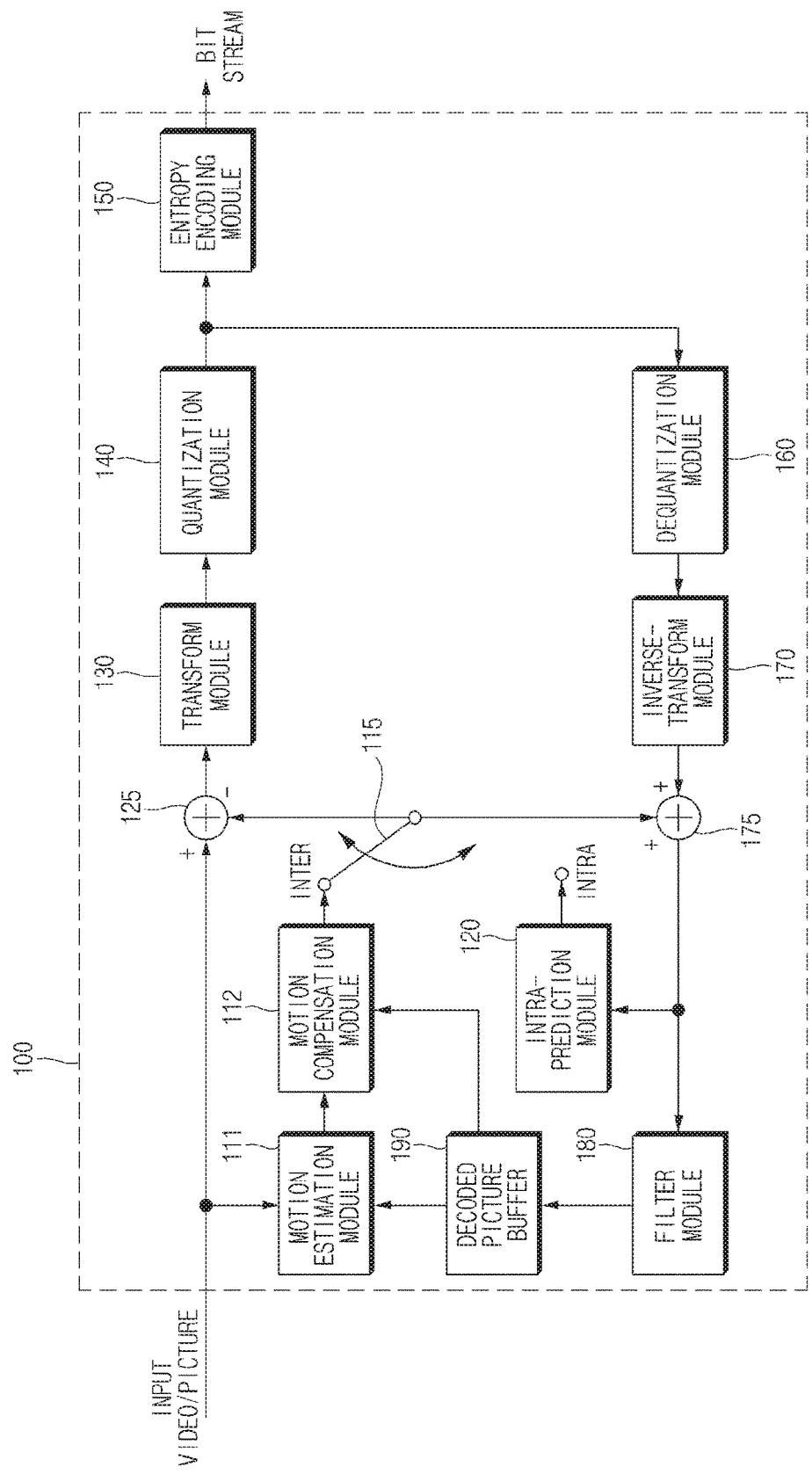
FIG. 1 is a block diagram illustrating the configuration of a picture encoding apparatus according to an embodiment of the present invention.

FIG. 1 is a block diagram illustrating the configuration of a picture encoding apparatus according to an embodiment of the present invention. A scalable video encoding/decoding method or apparatus may be implemented by extension of a general video encoding/decoding method or apparatus that does not provide scalability. The block diagram of FIG. 1 illustrates an embodiment of a picture encoding apparatus that may be a basis for a scalable video encoding apparatus.

Referring to FIG. 1, the picture encoding apparatus 100 includes a motion estimation module 111, a motion compensation module 112, an intra-prediction module 120, a switch 115, a subtracting module 125, a transform module 130, a quantization module 140, an entropy encoding module 150, an dequantization module 160, an inverse-transform module 170, an adding module 175, a filter module 180, and a decoded picture buffer 190.

The picture encoding apparatus 100 conducts encoding on an input picture in an intra mode or inter mode and may output a bit stream. The intra-prediction means intra-frame prediction, and the inter-prediction means inter-frame prediction. In the case of the intra mode, the switch 115 switches to intra, and in the case of the inter mode, the switch 115 switches to inter. The pictutre encoding apparatus 100 generates a predicted block for an input block of the input picture and then may encode a difference between the input block and the predicted block.

In the case of the intra mode, the intra-prediction module 120 may generate a predicted block by conducting spatial prediction using a pixel value of an already encoded block adjacent to a current block.

In the case of the inter mode, the motion estimation module 111 may seek a region that best matches the input block in a reference picture stored in the decoded picture buffer 190 during the motion estimation process, thereby deriving a motion vector. The motion compensation module 112 may generate a predicted block by conducting motion compensation using a decoded picture stored in the reference picture buffer 190 and the motion vector.

The subtracting module 125 may generate a residual block by a difference between the input block and the predicted block. The transform module 130 may conduct transform on the residual block, thereby outputting a transform coefficient. The quantization module 140 may output a quantized coefficient by quantizing the input transform coefficient according to a quantization parameter.

The entropy encoding module 150 may output a bit stream by entropy-encoding a symbol according to a probability distribution, based on values obtained by the quantization module 140 or encoding parameters obtained during the encoding process. The entropy encoding is a method by which a symbol having various values is received and is represented by a sequence of binary numbers while removing statistical redundancy.

Here, the symbol means a syntax element to be encoded/decoded and an encoding parameter, or a residual signal. The encoding parameter is an intervening variable necessary for encoding and decoding and may include information that may be inferred upon encoding or decoding, as well as information, such as a syntax element, that is encoded by the encoding device and is delivered to a decoding device and means information necessary upon encoding or decoding a picture. The encoding parameter may include, e.g., an intra/inter prediction mode, shift/motion vector, reference picture index, encoding block pattern, presence or absence of a residual signal, transform coefficient, quantized transform coefficient, quantization parameter, block size, block division information value or statistic. Further, the residual signal may mean a difference between an original signal and a predicted signal, or may mean a signal obtained by transforming a difference between an original signal and a predicted signal or a signal obtained by transforming and quantizing a difference between an original signal and a predicted signal. The residual signal may be referred to as residual block from the point of view of the unit of block.

When entropy-encoding applies, fewer bits are assigned to a symbol having a higher chance of occurrence, while more bits are assigned to a symbol having a low chance of occurrence, thereby representing a symbol. Therefore, the size of a bit sequence for symbols to be encoded may be reduced. Accordingly, compression performance of picture encoding may be increased by entropy-encoding.

Encoding schemes such as exponential golomb, CAVLC (Context-Adaptive Variable Length Coding), CABAC (Context-Adaptive Binary Arithmetic Coding), may be used for entropy-encoding. For example, a table for conducting entropy-encoding, such as a VLC (Variable Length Coding/Code) table may be stored in the entropy encoding module 150, and the entropy encoding module 150 may conduct entropy encoding using the stored VLC table. Further, the entropy encoding module 150 derives a method of binarizing a target symbol and probability model of a target symbol/bin and then may conduct entropy-encoding using the derived binarization method or probability model.

The quantized coefficient is inverse-quantized by the dequantization module 160 and may be inverse-transformed by the inverse-transform module 170. The inverse-quantized, inverse-transformed coefficient is added to the predicted block by the adding module 175, and a reconstructed block may be then generated.

The reconstructed block goes through the filter module 180 that then applies at least one or more of a deblocking filter, an SAO (Sample Adaptive Offset), and an ALF (Adaptive Loop Filter) to the reconstructed block or reconstructed picture. After undergoing the filter module 180, the reconstructed block may be stored in the decoded picture buffer 190.

Figure 2:
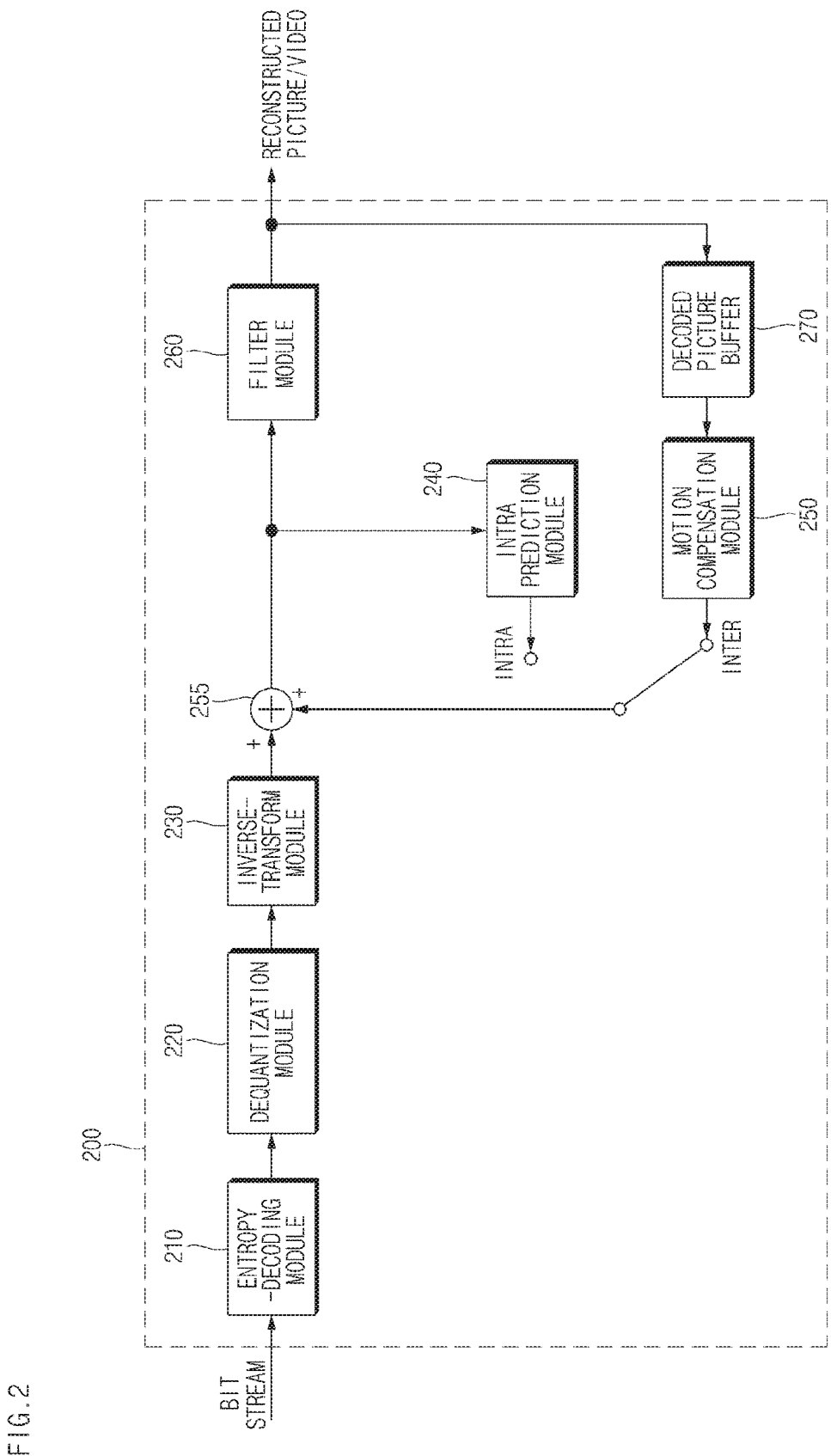
FIG. 2 is a block diagram illustrating the configuration of a picture decoding apparatus according to an embodiment of the present invention.

FIG. 2 is a block diagram illustrating the configuration of a picture decoding apparatus according to an embodiment of the present invention. As described above in connection with FIG. 1, the scalable video encoding/decoding method or apparatus may be implemented by extension of a general picture encoding/decoding method or apparatus that does not provide scalability, and the block diagram of FIG. 2 illustrates an embodiment of a picture decoding apparatus that may be a basis for the scalable video decoding apparatus.

Referring to FIG. 2, the picture decoding apparatus 200 includes an entropy-decoding module 210, a dequantization module 220, an inverse-transform module 230, an intra prediction module 240, a motion compensation module 250, a filter module 260, and a decoded picture buffer 270.

The picture decoding apparatus 200 may receive the bit stream output from the encoding apparatus, conduct decoding on the bit stream in an intra mode or inter mode, and may output a reconfigured picture, i.e., reconstructed picture. In the case of the intra mode, the switch switches to intra, and in the case of the inter mode, the switch switches to inter. The picture decoding apparatus 200 may obtain a residual block reconstructed from the received bit stream, generate a predicted block, add the reconstructed residual block to the predicted block, and generate a reconfigured block, i.e., reconstructed block.

The entropy-decoding module 210 entropy-decodes the input bit stream according to a probability distribution to thereby generate symbols including quantized coefficient-type symbols. The entropy-decoding is a method in which a sequence of binary numbers is received to generate each symbol. The entropy decoding method is similar to the above-described entropy encoding method.

The quantized coefficient is dequantized by the dequantizaion module 220, is inverse-transformed by the inverse-transform module 230, and as a result of the dequantization/inverse-transform of the quantized coefficient, a reconstructed residual block may be generated.

In the case of the intra mode, the intra prediction module 240 may conduct spatial prediction using a pixel value of an already encoded block adjacent to a current block, thereby generating a predicted block. In the case of the inter mode, the motion compensation module 250 may conduct motion compensation using a reference picture stored in the decoded picture buffer 270 and the motion vector, thereby generating a predicted block.

The reconstructed residual block is added to the predicted block by the adder 255, and the added result undergoes the filter module 260. The filter module 260 may apply at least one or more of a deblocking filter, an SAO, and an ALF to the reconstructed block or reconstructed picture. The filter module 260 outputs a reconfigured picture, i.e., reconstructed picture. The reconstructed picture is stored in the decoded picture buffer 270 and may be used for inter prediction.

Among the entropy-decoding module 210, the dequantization module 220, the inverse-transform module 230, the intra prediction module 240, the motion compensation module 250, the filter module 260, and the decoded picture buffer 270 included in the picture decoding apparatus 200, components directly associated with picture decoding, for example, the entropy-decoding module 210, the dequantization module 220, the inverse-transform module 230, the intra predictinon module 240, the motion compensation module 250, or the filter module 260 may be referred to as a decoding unit separately from the other components.

Further, the picture decoding apparatus 200 may further include a parsing module (not shown) that parses information on an encoded picture included in the bit stream. The parsing module may include the entropy-decoding module 210, or the parsing module may be included in the entropy-decoding module 210. Such parsing module may also be implemented as one component of the decoding unit.

Figure 3:
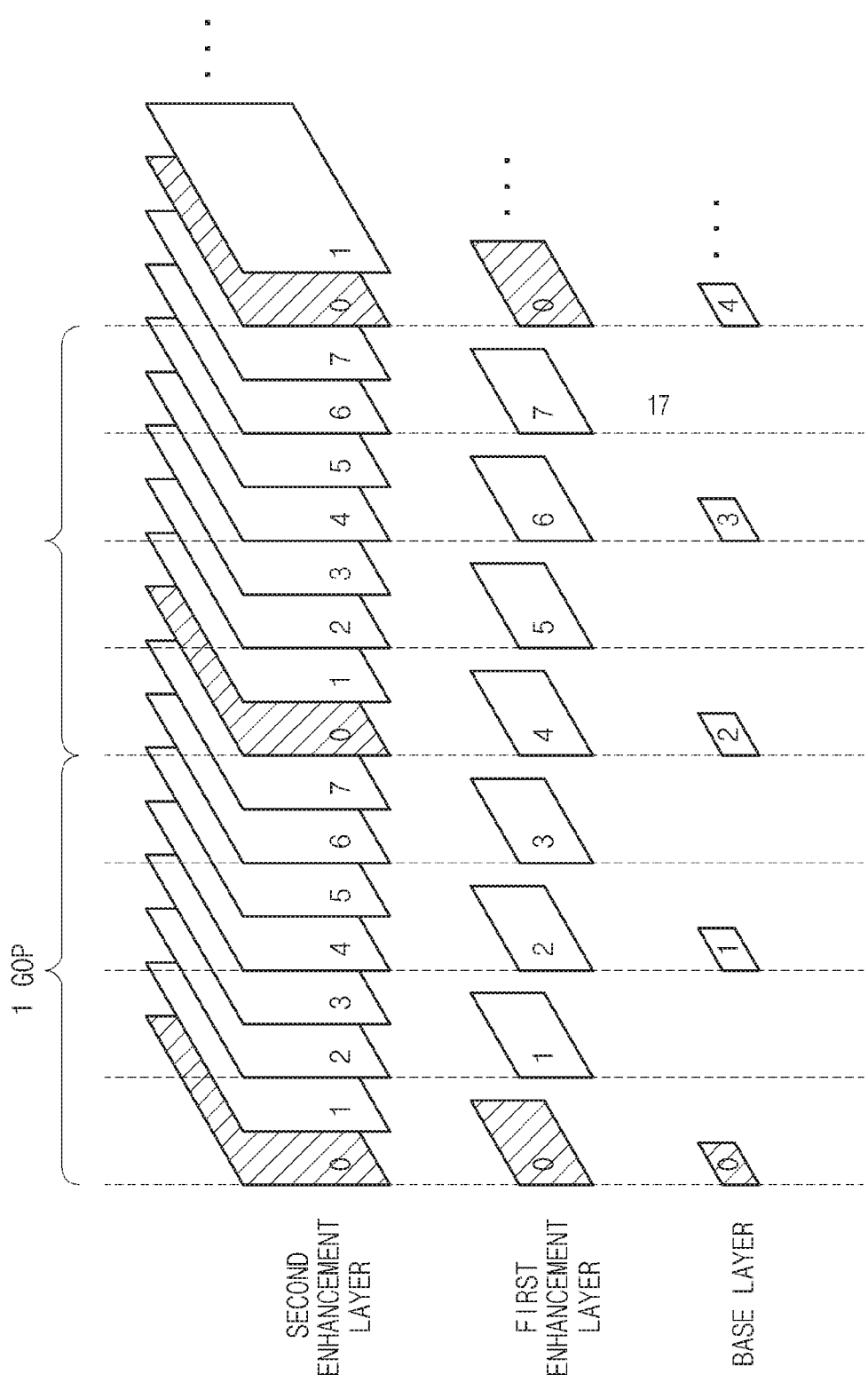
FIG. 3 is a concept view schematically illustrating an embodiment of a scalable video coding architecture using multiple layers, to which the present invention may apply.

FIG. 3 is a concept view schematically illustrating an embodiment of a scalable video coding architecture using a plurality of layers to which the present invention may apply. In FIG. 3, the GOP (Group of Picture) refers to a picture group, i.e., a group of pictures.

In order to transmit picture data, a transmission medium is required, and its performance may vary per transmission medium depending on network environment. For applications to such various transmission media or network environments, a scalable video coding method may be provided.

The scalable video coding method is a coding method that boosts encoding/decoding performance by removing inter-layer redundancy utilizing inter-layer texture information, motion information, or residual signal. The scalable video coding method may offer various types of scalability from the spatial, temporal, or picture quality point of view depending on ambient conditions such as transmission bit rate, transmission error rate, or system resources.

The scalable video coding may be conducted using multiple layers structure so as to be able to provide a bit stream that may be applicable to various network circumstances. For example, the scalable video coding structure may include a base layer that compresses and processes picture data using a general picture encoding method and an enhancement layer that compresses and processes picture data using both base layer encoding information and general picture encoding method.

Here, the "layer" means a set of picture or bit streams that may be differentiated based on spatial (for example, picture size), temporal (for example, order of encoding, order of outputting picture, frame rate), picture quality, or complexity. Further, the base layer may mean a lower layer, reference layer or base layer, and the enhancement layer may mean an upper layer. Further, the multiple layers may have dependency between each other.

Referring to FIG. 3, for example, the base layer may be defined by SD (standard definition), 15 Hz frame rate, 1 Mbps bit rate, the first enhancement layer by HD (high definition), 30 Hz frame rate, and 3.9 Mbps bit rate, and the second enhancement layer by 4K-UHD (ultra high definition), 60 Hz frame rate, and 27.2 Mbps bit rate. The formats, frame rates, and bit rates are merely an embodiment, and may vary as necessary. Further, the number of layers used is not limited thereto, and may vary depending on circumstance.

For example, if the transmission bandwidth is 4 Mbps, the frame rate of the first enhancement layer HD may be reduced so that transmission may be conducted by 15 Hz or less. The scalable video coding method may offer temporal, spatial, or quality scalability by the above-described method in the embodiment described in connection with FIG. 3.

In the case of encoding and decoding a video that supports multiple layers in the bit stream, i.e., scalable coding, a strong correlation exists between the multiple layers, so that when prediction is carried out using such correlation, redundant elements in the data may be eliminated, and encoding performance of pictures can be enhanced. Conducting prediction on a current layer that is a target for prediction using information of a different layer is hereinafter referred to as inter-layer prediction. The scalable video coding hereinafter means scalable video encoding, in the encoding point of view, and scalable video decoding in the decoding point of view.

At least one of resolution, frame rate, and color format may differ between the multiple layers, and up-sampling or down-sampling for layers may be conducted in order to adjust resolution upon inter-layer prediction.

Figure 4:
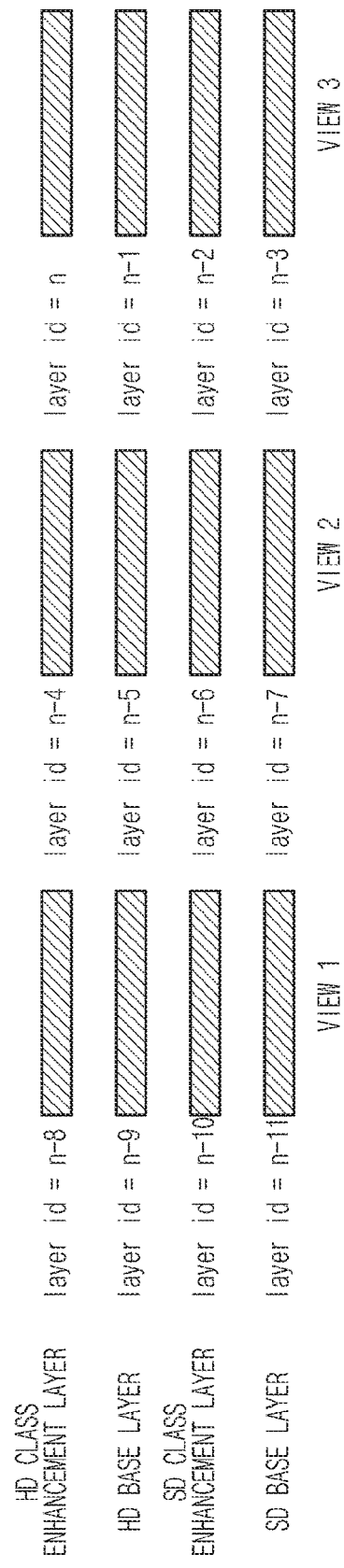
FIG. 4 is a concept view schematically illustrating a spatial-quality layer and a view layer according to an embodiment of the present invention.

FIG. 4 is a concept view schematically illustrating a spatial-quality layer and view layer according to an embodiment of the present invention.

As illustrated, the bit stream may include multiple layers.

The bit stream may include multiple view layers (view 1, view 2, view 3) having the same spatialand quality and different views from each other.

Further, the bit stream may include layers having the same view but different spatial resolution and qualities from each other. The spatialquality layers may be classified into SD class layers and HD class layers which may be constituted of base layer(s) and enhancement layer(s).

As illustrated, each layer may be identified by an identifier (layer_id) in order to identify the layers having spatial, quality and views mixed. Information on which layer each identifier is about (for example, view layer, spatial and quality layers) and whether it indicates an upper layer or a lower layer in the layers may be signaled, included in a VPS (video parameter set) or SPS (sequence parameter set), or NAL unit header.

As described above, when inter-layer prediction is conducted using inter-layer correlation, at least one or more lower layers are used to predict an upper layer. Hereinafter, for ease of description, a layer to be subjected to prediction is denoted a "target layer," and a layer to be used or referenced for prediction of a target layer is denoted a "reference layer."

The present invention concerns efficiently generating and managing a reference layer list considering encoding efficiency of spatial, quality, and view scalability when encoding blocks in the same slice using one or more reference layers.

In the typical inter-prediction, at least one of a previous picture or a subsequent picture of a current picture is determined as a reference picture, and based on the reference picture, prediction on the current block can be conducted. The picture used for predicting a current block is referred to as reference picture or reference frame.

A region in the reference picture may be represented using, e.g., a reference picture index (refIdx) indicating the reference picture and a motion vector.

In the inter-prediction, a reference picture and a reference block corresponding to a current block in the reference picture may be selected to generate a predicted block for the current block.

In the information, the encoding apparatus and the decoding apparatus may derive motion information of the current block and then may perform inter-prediction and/or motion compensation based on the deriveed motion information. At this time, the encoding apparatus and the decoding apparatus may enhance encoding/decoding efficiency by utilizing motion information of a reconstructed neighboring block and/or motion information of a collocated block corresponding to the current block in an already reconstructed collocated picture.

Here, the reconstructed neighboring block is a block in the current picture, which has been already encoded and/or decoded and reconstructed, and may include a block adjacent to the current block and/or a block positioned at an outer corner of the current block. Further, the encoding apparatus and the decoding apparatus may determine a predetermined relative position with respect to a block positioned at a location spatially corresponding to the current block in the collocated picture and may derive the collocated block based on the determined, predetermined relative position (position in and/or outside the block positioned at a location spatially corresponding to the current block). Here, by way of example, the collocated picture may correspond to one of the reference pictures included in the reference picture list.

In the inter-prediction, a predicted block may be generated so that the residual signal with the current block is minimized and the size of the motion vector is minimized.

Meanwhile, the scheme for deriving motion information may vary depending on the prediction mode of the current block. Prediction modes applying to inter-prediction may include an AMVP (Advanced Motion Vector Predictor) or a merge.

By way of example, in case the AMVP (Advanced Motion Vector Predictor) applies, the encoding apparatus and the decoding apparatus may generate a prediction motion vector candidate list using the motion vector of the reconstructed neighboring block and/or motion vector of the collocated block. That is, the motion vector of the reconstructed neighboring block and/or the motion vector of the collocated block may be prediction motion vector candidates. The encoding apparatus may transmit to the decoding apparatus a prediction motion vector index indicating the optimal prediction motion vector selected among the prediction motion vector candidates included in the list. At this time, the decoding apparatus may select a prediction motion vector of the current block among the prediction motion vector candidates included in the prediction motion vector candidate list, using the prediction motion vector index.

The encoding apparatus may obtain a motion vector difference (MVD) between the motion vector of the current block and the prediction motion vector, may encode the MVD and may transmit the encoded MVD to the decoding apparatus. At this time, the decoding apparatus may decode the received MVD and may derive the motion vector of the current block through a sum of the decoded MVD and the prediction motion vector.

The encoding apparatus may transmit, e.g., a reference picture index indicating a reference picture to the decoding apparatus.

The decoding apparatus may predict the motion vector of the current block using the motion information of the neighboring block and may derive the motion vector for the current block using the residual difference value with respect to the motion vector received from the decoding apparatus. The decoding apparatus may generate the predictied block for the current block based on the reference picture index information received from the encoding apparatus and the derived motion vector.

As another example, in case the merge applies, the encoding apparatus and the decoding apparatus may generate a merge candidate list using the motion information of the collocated block and/or the motion information of the reconstructed neighboring block. That is, the encoding apparatus and the decoding apparatus, in case there is motion information of the reconstructed neighboring block and/or current block, may use the motion information as a merge candidate for the current block.

The encoding apparatus may select a merge candidate that may provide the optimal encoding efficiency among merge candidates included in the merge candidate list, as the motion information on the current block. At this time, a merge index indicating the selected merge candidate may be transmitted to the decoding apparatus, included in the bit stream. The decoding apparatus may select one of the merge candidates included in the merge candidate list using the transmitted merge index and may determine the selected merge candidate as the motion information of the current block. Accordingly, in case the merge mode applies, the motion information of the reconstructed neighboring block and/or collocated block may be, as is, used as the motion information of the current block. The decoding apparatus may reconstruct the current block by adding the prediction block to the residual transmitted from the encoding apparatus.

In the above-described AMVP and merge mode, the motion information of the reconstructed neighboring block and/or motion information of the collocated block may be used to derive motion information of the current block.

In the case of skip mode, one of the other modes used for inter-prediction, information of the neighboring block may be, as is, used for the current block. Accordingly, in the case of skip mode, the encoding apparatus does not transmit to the decoding apparatus syntax information such as residual, other than information indicating which block's motion information is to be used, as the motion information of the current block.

The encoding apparatus and the decoding apparatus may generate the predicted block of the current block by performing motion compensation on the current block based on the obtained motion information. Here, the predicted block may mean a motion-compensated block that has been generated as a result of motion compensation for the current block. Further, multiple motion-compensated blocks may constitute one motion-compensated picture.

The decoding apparatus may verify the skip flag or merge flag received from the encoding apparatus and may derive motion information necessary for inter-prediction of the current block, for example, information on the motion vector or reference picture index accordingly.

The unit of processing, which is subjected to prediction, may differ from the unit of processing, which a prediction method and its details are determined. For example, a prediction mode may be determined on a per-prediction block basis, and prediction may be conducted on a per-transform block basis. A prediction mode may be determined on a per-prediction block basis, and intra prediction may be conducted on a per-transform block basis.

Figure 5:
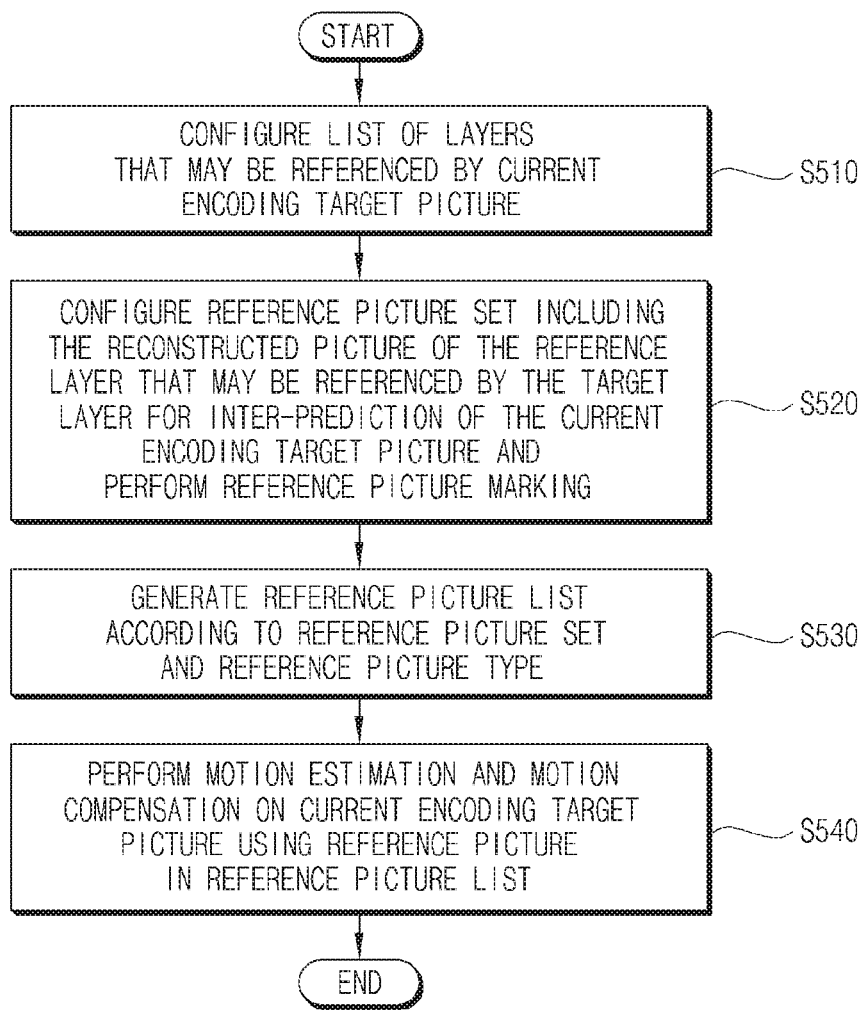
FIG. 5 is a flowchart illustrating a method of performing upper layer encoding in an encoding apparatus according to an embodiment of the present invention.

FIG. 5 is a flowchart illustrating a method of performing upper layer encoding in an encoding apparatus according to an embodiment of the present invention.

Hereinafter, a method of performing upper layer encoding in a video encoding method using a multi-layer structure and supporting at least one or more scalabilities (for example, spatial, quality, and view scalability), more specifically, a method of configuring a reference layer list that may be referenced by a target picture is described.

First, the encoding apparatus configures a list of layers that may be referenced by a current encoding target picture (S510).

The encoding apparatus may configure a reference layer list including at least one or more layers that may be referenced, upon encoding, in the same view by the current encoding target layer among lower layers of the current encoding target layer. The reference layer list may be configured according to at least one of the methods described below.

According to a first embodiment, the encoding apparatus may configure a reference layer list that may be referenced by the same layers as the current encoding target layer in the whole bit stream.

The encoding apparatus may generate a reference layer list by configuring, in an arbitrary order, reference layers that may be referenced by the same layers as the target layer.

Or, the reference layer list may be configured in ascending order from the layer (i.e., the closest layer) having the smallest difference between its layer_id value and the layer_id value of the target layer among the reference layers.

Or, the reference layer list of the current encoding target layer may be configured in descending order from the layer having the largest priority among the reference layers.

Priority-related information may be signaled, included in an NAL unit header or video parameter set.

Or, for the layers having the same view as the current encoding target layer, the reference layer list may be configured in ascending order from the layer having the smallest difference in spatial resolution from the current encoding target layer. At this time, the quality reference layers that have the same spatial resolution may be configured in ascending order from the layer (i.e., closest layer) having the smallest difference between its layer_id value and the layer_id value of the current encoding target layer.

Additionally, the layers may be included in the reference layer list in the order away from the layer having the closest view to the view of the current encoding target layer. In the case of having the same view, the layers may be added to the reference layer list, in the same way as does on the layers having the same view as the current encoding target layer.

For example, in the bit stream architecture illustrated in FIG. 4, a reference layer list of layers with n as their layer_id may be configured so that their layer_id's are configured in the order of n-1, n-2, n-3, n-4, n-5, n-6, n-7, n-8, n-9, n-10, and n-11.

Or, a reference layer list including reference layers having the same view as the current encoding target layer may be configured in ascending order from the layer having smallest difference in spatial resolution from the current encoding target layer. At this time, when the layers have the same spatial resolution, the order of quality reference layers may be from a lower quantization parameter value to be encoded to a higher value (i.e., in descending order from the layer having the best quality upon decoding).

Additionally, the layers may be included in the reference layer list in the order away from the view closest to the view of the current encoding target layer. When the layers have the same view, the layers may be included in the reference layer list in the same way as does on the layers having the same view as the current encoding target layer.

The reference layer referenced by the target layer may be described using layer_id signaled in the bit stream. Examples of the video parameter set describing reference layers are shown in Tables 1 and 2:

TABLE 1

| vps_extension( ) { | Descriptor |
|---|---|
| while( !byte_aligned( )) | |
| vps_extension_byte_alignment_reserved_one_bit | u(1) |
| avc_base_code_flag | u(1) |
| scatability_mask | u(16) |
| for( i = 0; i <NumScalabilityTypes; i++ ) { | |
| dimension_id_len_minus1 [i ] | u(3) |
| } | |
| vps_nuh_layer_id_present_flag | u(1) |
| //layer specific information | |
| for( i = 1; i <= vps_max_layers_minus1; i++ ) { | |
| // mapping at layer ID to scalability dimension IDs | |
| if( vps_nuh_layer_id_present_flag ) | |
| nuh_layer_id [i ] | u(6) |
| for( j = 0; j <= num_dimension_minus1; j++ ) { | |
| dimension_id [ i ][ j ] | u(v) |
| } | |
| for( i = 1; i <= vps_max_layers_minus1; i++ ) | |
| profile_tier_level( 1, | |
| vps_max_sub_layers_minus1 ) | |
| for(i = 1; i <= vps_max_layers_minus1; i++ ) { | |
| // layer dependency | |
| num_direct_ref_layers [i ] | u(6) |
| for(j = 0; j < num_direct_ref_layers [ j ]; i++ ) | |
| ref_layers_id [i ][j ] | u(6) |
| } | |
| } | |

Referring to Table 1, num_direct_ref_layers[i] specifies the number of reference layers that are directly referenced by the ith layer (i.e., layer having layer_id of nuh_layer_id[i]).

ref_layer_id[i][j] specifies layer_id of the jth reference layer referenced by the ith layer. That is, ref_layer_id[i][j] means that the layer whose layer_id is nuh_layer_id[i] references the layer whose layer_id is nuh_layer_id[j].

TABLE 2

| vps_extension( ) { | Descriptor |
|---|---|
| while( !byte_aligned( )) | |
| vps_extension_byte_alignment_reserved_one_bit | u(1) |
| avc_base_codec_flag | u(1) |
| scalability_mask | u(16) |
| for( i = 0; i <NumScalabilityTypes; i++ ) { | |
| dimension_id_len_minus1 [i ] | u(3) |
| } | |
| vps_nuh_layer_id_present_flag | u(1) |
| //layer specific information | |
| for( i = 1; i <= vps_max_layers_minus1; i++ ) { | |
| // mapping of layer ID to scalability dimension IDs | |
| if( vps_nuh_layer_id_present_flag ) | |
| nuh_layer_id [i ] | u(6) |
| for(j = 0; j <= num_dimensions_minus1; j++ ) { | |
| dimension_id [ i ][ j ] | u(v) |
| } | |
| for( i = 1; i <= vps_max_layers_minus1; i++ ) | |
| profile_tier_level( 1, | |
| vps_max_sub_layers_minus1 ) | |
| for(i = 1;i <= vps_max_layers_minus1; i++ ) { | |
| //layer dependency | |
| for( j = 0, j < i; j++ ) | |
| direct_dependency_flag[ i ][ j ] | u(1) |
| max_one_active_ref_layer_flag | u(1) |
| } | |
| } | |

Referring to Table 2, direct_dependency_flag[i][j] being 1 specifies that the ith layer (i.e., layer having layer_id of nuh_layer_id[i]) directly references the jth reference layer (i.e., layer having layer_id of nuh_layer_id[j]).

max_one_active_ref_layer_flag being 1 specifies that up to one picture is used for inter-layer prediction of each picture, i.e., the ith layer, in the whole bit stream. max_one_active_ref_layer_flag being 0 may denote that more than one picture may be used for inter-layer prediction of a specific image, i.e., the ith layer, in the bit stream. Or, max_one_active_ref_layer_flag being 0 may represent that the ith layer does not use inter-layer prediction.

Meanwhile, max_one_active_ref_layer_flag may be signaled for each layer or only once in the entire bit stream.

When max_one_active_ref_layer_flag is signaled once in the entire bit stream, if all of the layers reference only one reference layer, max_one_active_ref_layer_flag may be 1. Accordingly, even when max_one_active_ref_layer_flag is 0, slice numdirect ref_layers, which specifies the number of reference layers of a specific layer, may be '1.'

According to a second embodiment for configuring a reference layer list, the encoding apparatus may configure a reference layer list that may be referenced by a target picture that is currently to be encoded. This is to configure a reference layer list that may be referenced by the current encoding target layer of a picture that is to be currently encoded, and may be constituted of one of the following methods.

The encoding apparatus may generate a reference layer list that may be referenced by the current encoding target picture by configuring reference layers in arbitrary order.

Or, the encoding apparatus may generate a reference layer list by configuring the reference layers in ascending order from the layer (i.e., closest layer) having the smallest difference in layer_id from the encoding target layer among the reference layers.

Or, the reference layer list may be configured in descending order from the layer having the highest priority among the reference layers having the same view as the target layer.

At this time, the priority-related information may be signaled, included in an NAL unit header or video parameter set.

Or, the reference layer list that may consist of the layers having the same view as the current encoding target layer may be configured in ascending order from the layer having the smallest difference in spatial resolution from the current encoding target layer. At this time, when having the same spatial resolution, the reference layers may be configured in ascending order from the layer (i.e., closest layer) having the smallest difference in layer_id from the current encoding target layer.

Additionally, the layers may be included in the reference layer list in the order away from the view closest to the view of the current encoding target layer. The layers having the same view may be included in the reference layer list in the same way as does on the layers having the same view as the current encoding target layer.

For example, in the bit stream architecture as illustrated in FIG. 4, the reference layer list of layers with n as their layer_id's may be configured in the order of the layers whose layer_id's are n-1, n-2, n-3, n-4, n-5, n-6, n-7, n-8, n-9, n-10, and n-11.

Or, the reference layer list constituted of the layers having the same view as the current encoding target layer may be configured in ascending order from the layer having the smallest difference in spatial resolution from the current encoding target layer among the reference layers At this time, when the layers have the same spatial resolution, the quality reference layers may be configured in ascending order from a lowest quantization parameter that is to be encoded (that is, in descending order from the layer having the best picture quality upon decoding).

Additionally, the layers may be included in the reference layer list in the order away from the view closest to the view of the current encoding target layer. When the layers have the same view, the layers may be included in the reference layer list in the same way as does on the layers having the same view as the current encoding target layer.

The reference layer that may be referenced by a slice of the current encoding target layer upon encoding may be described by various methods. Hereinafter, describing and signaling reference layers in the slice header is described with reference to Tables 3 to 24.

According to an embodiment corresponding to Tables 3 to 11, the slice header includes information on layers that may be referenced by a slice to be currently encoded in the sub-set of reference layers that may be referenced by the same layers as the current encoding target layer in the entire bit stream that is signaled in the video parameter set.

At this time, only when the slice to be currently encoded is encoded using inter-layer prediction, any one of the syntaxes in Tables 3 to 10 may apply.

TABLE 3

| slice_segment_header( ) { | Descriptor |
| --- | --- |
| first_slice_segment_in_pic_flag | u(1) |
| ... | |
| if(nuh_layer_id>0 && | |
| NumDirectRefLayers[nuh_layer_id]>0){ | |
| slice_num_direct_ref_layers | u(v) |
| for( j = 0; j < slice_num_direct_ref_layers; j++ ) | |
| ref_layer_id[j ] | u(6) |
| } | |
| ... | |
| } | |

Referring to Table 3, slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set.

ref_layer_id[j] specifies layer_id of the jth reference layer that is directly referenced by the picture.

TABLE 4

| slice_segment_header( ) { | Descriptor |
| --- | --- |
| first_slice_segment_in_pic_flag | u(1) |
| ... | |
| if(nuh_layer_id>0 && | |
| NumDirectRefLayers[nuh_layer_id]>0){ | |
| slice_num_direct_ref_layers | u(v) |
| for( j = 0; j < slice_num_direct_ref_layers; j++ ) | |
| ref_layer_id_delta [j] | u(v) |
| } | |
| ... | |
| } | |

Referring to Table 4, slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set.

ref_layer_id delta[j] specifies a difference between layer_id of the jth reference layer directly referenced by the picture and layer_id of the j−1th reference layer. At this time, the difference in the layer_id being close to "0" means that the current picture references the reference layer having layer_id close to the layer corresponding to the current picture. At this time, ref_layer_id delta[0] specifies a difference in layer_id between the $0^{th}$ reference layer and the layer to which the current picture belongs.

TABLE 5

| slice_segment_header( ) { | Descriptor |
| --- | --- |
| first_slice_segment_in_pic_flag | u(1) |
| ... | |
| if(nuh_layer_id>0 && | |
| NumDirectRefLayers[nuh_layer_id]>0){ | |
| slice_num_direct_ref_layers | u(v) |
| for( j = 0; j < slice_num_direct_ref_layers; j++ ) | |
| ref_layer_idx_delta [j] | u(v) |
| } | |
| ... | |
| } | |

Referring to Table 5, slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set.

ref_layer_idx delta[j] specifies a difference between the index (with respect to the index described in the video parameter set) of the jth reference layer directly referenced by the picture and the index (with respect to the index described in the video parameter set) of the j−1th reference layer. At this time, ref_layer_idx delta[0] specifies the index of the $0^{th}$ reference layer.

TABLE 6

| slice_segment_header( ) { | Descriptor |
|---|---|
|    first_slice_segment_in_pic_flag | u(1) |
|    ... | |
|    if(nuh_layer_id>0 && | |
|    NumDirectRefLayers[nuh_layer_id]>0){ | |
|       slice_num_direct_ref_layers | u(v) |
|       for( j = 0; j < slice_num_direct_ref_layers; j++ ) | |
|          ref_layer_idx [j] | u(v) |
|    } | |
|    ... | |
| } | |

Referring to Table 6, slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set.

ref_layer_idx[j] specifies the index (with respect to the index described in the video parameter set) of the jth reference layer directly referenced by the picture.

TABLE 7

| slice_segment_header( ) { | Descriptor |
|---|---|
|    first_slice_segment_in_pic_flag | u(1) |
|    ... | |
|    if(nuh_layer_id>0 && | |
|    NumDirectRefLayers[nuh_layer_id]>0){ | |
|       slice_num_direc_ref_layers | u(v) |
|       if(slice_num_direct_ref_layers>0) | |
|          for( j = 0; j < slice_num_direct_ref_layers; j++ ) | |
|             ref_layer_id [j] | u(v) |
|    } | |
|    ... | |
| } | |

Referring to Table 7, slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set. slice_num_direct_ref_layers being "0" means that the reference layer corresponding to the same layer as the picture signaled in the video parameter set may be used as the reference layer of the current picture.

ref_layer_id[j] specifies layer_id of the jth reference layer directly referenced by the picture.

TABLE 8

| slice_segment_header( ) { | Descriptor |
|---|---|
|    first_slice_segment_in_pic_flag | u(1) |
|    ... | |
|    if(nuh_layer_id>0 && | |
|    NumDirectRefLayers[nuh_layer_id]>0){ | |
|       slice_num_direct_ref_layers | u(v) |
|       if(slice_num_direct_ref_layers>0) | |
|          for( j = 0; j < slice_num_direct_ref_layers; j++ ) | |
|             ref_layer_id_delta [j] | u(v) |
|    } | |
|    ... | |
| } | |

Referring to Table 8, slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer ic]]) that are referenced by layers having the same layer_id (i.e., nuh_layer_id) as the picture signaled in the video parameter set. slice_num_direct_ref_layers being "0" means that the reference layer corresponding to the same layer as the picture signaled in the video parameter set may be used as the reference layer of the current picture.

ref_layer_id delta[j] specifies a difference in layer_id between the jth reference layer directly referenced by the picture and the j−1th reference layer. At this time, the difference in layer_id being close to "0" means that the current picture references the reference layer having layer_id close to the layer corresponding to the current picture. ref_layer_id delta[0] specifies a difference between layer_id of the $0^{th}$ reference layer and layer_id of the layer corresponding to the current picture.

TABLE 9

| slice_segment_header( ) { | Descriptor |
|---|---|
|    first_slice_segment_in_pic_flag | u(1) |
|    ... | |
|    if(nuh_layer_id>0 && | |
|    NumDirectRefLayers[nuh_layer_id]>0){ | |
|       slice_num_direct_ref_layers | u(v) |
|       if(slice_num_direct_ref_layers>0){ | |
|          for( j = 0; j < slice_num_direct_ref_layers; j++ ) | |
|             ref_layer_idx_delta [j] | u(v) |
|       } | |
|    ... | |
| } | |

Referring to Table 9, slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set.

slice_num_direct_ref_layers being "0" means that the reference layer corresponding to the same layer as the picture signaled in the video parameter set may be used as the reference layer of the current picture.

ref_layer_idx delta[j] specifies a difference between the index (with respect to the index described in the video parameter set) of the jth reference layer directly referenced by the image and the index (with respect to the index described in the video parameter set) of the j−1th reference layer. ref_layer_idx delta[0] specifies the index of the $0^{th}$ reference layer.

TABLE 10

| slice_segment_header( ) { | Descriptor |
|---|---|
|    first_slice_segment_in_pic_flag | u(1) |
|    ... | |
|    if(nuh_layer_id>0 && | |
|    NumDirectRefLayers[nuh_layer_id]>0){ | |
|       slice_num_direct_ref_layers | |
|       if(slice_num_direct_ref_layers>0) | u(v) |
|          for( j = 0; j < slice_num_direct_ref_layers; j++ ) | |
|             ref_layer_idx [j] | u(v) |

TABLE 10-continued

| slice_segment_header( ) { | Descriptor |
|---|---|
| } | |
| ... | |
| } | |

Referring to Table 10, slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set.

slice_num_direct_ref_layers being "0" means that the reference layer corresponding to the same layer as the picture signaled in the video parameter set may be used as the reference layer of the current picture.

ref_layer_idx[j] specifies the index (with respect to the index described in the video parameter set) of the jth reference layer directly referenced by the picture.

According to an embodiment corresponding to Tables 11 to 14, a flag, e.g., layer_dependency_vps_flag, indicating whether reference layers that may be referenced by the same layers as the current encoding target layer signaled in the video parameter set are used likewise in the slice to be currently encoded is signaled in the slice header.

In case the flag is "1," the reference layer information signaled in the video parameter set is used, and in case the flag is "0," the information on the reference layers described in the slice header may be used.

At this time, only when the slice or picture to be currently encoded is encoded using only inter-layer prediction, any one of the syntaxes in Tables 11 to 14 may apply.

TABLE 11

| slice_segment_header( ) { | Descriptor |
|---|---|
| first_slice_segment_in_pic_flag | u(1) |
| ... | |
| if(nuh_layer_id>0 && | |
| NumDirectRefLayers[nuh_layer_id]>0){ | |
|   layer_dependency_vps_flag | u(1) |
|   if (layer_dependency_vps_flag){ | |
|     slice_num_direct_ref_layers | u(v) |
|     for( j = 0; j < slice_num_direct_ref_layers; j++ ) | |
|       ref_layer_id[j] | u(v) |
|   } | |
| } | |
| ... | |
| } | |

Referring to Table 11, layer_dependency_vps_flag specifies whether reference layer information is signaled in the slice header or slice segment header. In case layer_dependency_vps_flag is "0," the reference layer information is signaled in the slice segment header. In case layer_dependency_vps_flag is "1," the reference layer information is not signaled in the slice segment header, but the reference layer information signaled in the video parameter set (VPS) extension may be used as the reference layer information of the picture.

slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set.

ref_layer_id[j] specifies layer_id of the jth reference layer directly referenced by the picture.

TABLE 12

| slice_segment_header( ) { | Descriptor |
|---|---|
| first_slice_segment_in_pic_flag | u(1) |
| ... | |
| if(nuh_layer_id>0 && | |
| NumDirectRefLayers[nuh_layer_id]>0){ | |
|   layer_dependency_vps_flag | u(1) |
|   if (layer_dependency_vps_flag){ | |
|     slice_num_direct_ref_layers | u(v) |
|     for( j = 0; j < slice_num_direct_ref_layers; j++ ) | |
|       ref_layer_id_delta [j] | u(v) |
|   } | |
| } | |
| ... | |
| } | |

Referring to Table 12, layer_dependency_vps_flag specifies whether reference layer information is signaled in the slice header or slice segment header. In case layer_dependency_vps_flag is "0," the reference layer information is signaled in the slice segment header. In case layer_dependency_vps_flag is "1," the reference layer information is not signaled in the slice segment header, but the reference layer information signaled in the video parameter set (VPS) extension may be used as the reference layer information of the picture.

slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set.

ref_layer_id delta[j] specifies a difference in layer_id between the jth reference layer directly referenced by the picture and the j−1th reference layer. ref_layer_id delta[0] specifies a difference between ref_layer_id[0] and layer_id of the current picture.

TABLE 13

| slice_segment_header( ) { | Descriptor |
|---|---|
| first_slice_segment_in_pic_flag | u(1) |
| ... | |
| if(nuh_layer_id>0 && | |
| NumDirectRefLayers[nuh_layer_id]>0){ | |
|   layer_dependency_vps_flag | u(1) |
|   if (layer_dependency_vps_flag){ | |
|     slice_num_direct_ref_layers | u(v) |
|     for( j = 0; j < slice_num_direct_ref_layers; j++ ) | |
|       ref_layer_idx_delta [j] | u(v) |
|   } | |
| } | |
| ... | |
| } | |

Referring to Table 13, layer_dependency_vps_flag specifies whether reference layer information is signaled in the slice header or slice segment header. In case layer_dependency_vps_flag is "0," the reference layer information is signaled in the slice segment header. In case layer_dependency_vps_flag is "1," the reference layer information is not signaled in the slice segment header, but the reference layer information signaled in the video parameter set (VPS) extension may be used as the reference layer information of the picture.

slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set.

ref_layer_idx delta[j] specifies the index (with respect to the index described in the video parameter set) of the jth reference layer directly referenced by the picture and the index (with respect to the index described in the video parameter set) of the j−1th reference layer. ref_layer_id delta[0] specifies the index of the 0$^{th}$ reference layer.

TABLE 14

| slice_segment_header( ) { | Descriptor |
|---|---|
|     first_slice_segment_in_pic_flag | u(1) |
|     ... | |
| if(nuh_layer_id>0 && | |
| NumDirectRefLayers[nuh_layer_id]>0){ | |
|     layer_dependency_vps_flag | u(1) |
|     if (layer_dependency_vps_flag){ | |
|       slice_num_direct_ref_layers | u(v) |
|       for( j = 0; j < slice_num_direct_ref_layers; j++ ) | |
|         ref_layer_idx [j] | u(v) |
|       } | |
|     } | |
|     ... | |
| } | |

Referring to Table 14, layer_dependency_vps_flag specifies whether reference layer information is signaled in the slice header or slice segment header. In case layer_dependency_vps_flag is "0," the reference layer information is signaled in the slice segment header. In case layer_dependency_vps_flag is "1," the reference layer information is not signaled in the slice segment header, but the reference layer information signaled in the video parameter set (VPS) extension may be used as the reference layer information of the picture.

slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set.

ref_layer_idx[j] specifies the index (with respect to the index described in the video parameter set) of the jth reference layer directly referenced by the picture.

According to an embodiment corresponding to Tables 15 to 18, the number of reference layers of the slice to be currently encoded may be signaled, included in the slice header (for example, slice_num_direct_ref_layers). At this time, the reference layers are signaled only when the signaled number of reference layers is not equal to the number of reference layers (for example, NumDirectRefLayers[nuh_layer_id]) that may be referenced by the same layers as the current encoding target layer signaled in the video parameter set.

At this time, only when the slice to be currently encoded is encoded using inter-layer prediction, any one of the syntaxes in Tables 15 to 18 may apply.

TABLE 15

| slice_segment_header( ) { | Descriptor |
|---|---|
|     first_slice_segment_in_pic_flag | u(1) |
|     ... | |
| if(nuh_layer_id>0 && | |
| NumDirectRefLayers[nuh_layer_id]>0){ | |
|     slice_num_direct_ref_layers | u(v) |
|     if(slice_num_direct_ref_layers != | |
|     NumDirectRefLayers[nuh_layer_id]) | |
|       for( j = 0; j < slice_num_direct_ref_layers; j++ ) | |
|         ref_layer_id [j] | u(v) |
|     } | |
|     ... | |
| } | |

Referring to Table 15, slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set. In case NumDirectRefLayers[nuh_layer_id] is the same as slice_num_direc_ref_layers, the reference layer information signaled in the VPS extension is used as the reference layer information of the picture, and in case NumDirectRefLayers[nuh_layer_id] is not the same as slice_num_direc_ref_layers, the reference layer information signaled in the slice segment header is used as the reference layer information of the picture.

ref_layer_id[j] specifies layer_id of the jth reference layer directly referenced by the picture.

TABLE 16

| slice_segment_header( ) { | Descriptor |
|---|---|
|     first_slice_segment_in_pic_flag | u(1) |
|     ... | |
| if(nuh_layer_id>0 && | |
| NumDirectRefLayers[nuh_layer_id]>0){ | |
|     slice_num_direct_ref_layers | u(v) |
|     if(slice_num_direct_ref_layers != | |
|     NumDirectRefLayers[nuh_layer_id]) | |
|       for( j = 0; j < slice_num_direct_ref_layers; j++ ) | |
|         ref_layer_id_delta [j] | u(v) |
|     } | |
|     ... | |
| } | |

Referring to Table 16, slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set. In case NumDirectRefLayers[nuh_layer_id] is the same as slice_num_direc_ref_layers, the reference layer information signaled in the VPS extension is used as the reference layer information of the picture, and in case NumDirectRefLayers[nuh_layer_id] is not the same as slice_num_direc_ref_layers, the reference layer information signaled in the slice segment header is used as the reference layer information of the picture.

ref_layer_id delta[j] specifies a difference in layer_id between the jth reference layer directly referenced by the picture and the j−1th reference layer. ref_layer_id delta[0] specifies a difference between ref_layer_id[O] and layer_id of the current picture.

TABLE 17

| slice_segment_header( ) { | Descriptor |
|---|---|
|     first_slice_segment_in_pic_flag | u(1) |
|     ... | |
| if(nuh_layer_id>0 && | |
| NumDirectRefLayers[nuh_layer_id]>0){ | |
|     slice_num_direct_ref_layers | u(v) |
|     if(slice_num_direct_ref_layers != | |
|     NumDirectRefLayers[nuh_layer_id]) | |
|       for( j = 0; j < slice_num_direct_ref_layers; j++ ) | |
|         ref_layer_idx_delta [j] | u(v) |
|     } | |
|     ... | |
| } | |

Referring to Table 17, slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set. In case NumDirectRefLayers[nuh_layer_id] is the same as slice_num_direc_ref_layers, the reference layer information signaled in the VPS extension is used as the reference layer information of the picture, and in case NumDirectRefLayers[nuh_layer_id] is not the same as slice_num_direc_ref_layers, the reference layer information signaled in the slice segment header is used as the reference layer information of the picture.

ref_layer_id delta[j] specifies a difference between the index (with respect to the index described in the video parameter set) of the jth reference layer directly referenced by the picture and the index (with respect to the index described in the video parameter set) of the j−1th reference layer. ref_layer_id delta[0] specifies the index of the 0$^{th}$ reference layer.

TABLE 18

| slice_segment_header( ) { | Descriptor |
|---|---|
|     first_slice_segment_in_pic_flag | u(1) |
|     ... | |
| if(nuh_layer_id>0 && | |
| NumDirectRefLayers[nuh_layer_id]>0){ | |
|     slice_num_direct_ref_layers | u(v) |
|     if(slice_num_direct_ref_layers != | |
|     NumDirectRefLayers[nuh_layer_id]) | |
|       for( j = 0; j < slice_num_direct_ref_layers; j++ ) | |
|         ref_layer_idx [j] | u(v) |
|     } | |
|     ... | |
| } | |

Referring to Table 18, slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set. In case NumDirectRefLayers[nuh_layer_id] is the same as slice_num_direc_ref_layers, the reference layer information signaled in the VPS extension is used as the reference layer information of the picture, and in case NumDirectRefLayers[nuh_layer_id] is not the same as slice_num_direc_ref_layers, the reference layer information signaled in the slice segment header is used as the reference layer information of the picture.

ref_layer_idx[j] specifies the index (with respect to the index described in the video parameter set) of the jth reference layer directly referenced by the picture.

According to another embodiment of the present invention, in case the slice to be currently encoded is encoded using inter-layer prediction, the signals shown in Tables 19 to 24 may be signaled.

As shown in Table 2, when the flag (e.g., max_one_active_ref_layer_flag) indicating whether the number of reference layers that may be referenced by the same layers as the current encoding target layer in the video parameter set is at most one is signaled and the flag is "0," Tables 19 to 24 may apply. That is, an embodiment in which in case the same layers as the current encoding target layer have two or more reference layers, the number (e.g., slice_num_direct_ref_layers) of reference layers of the slice to be currently encoded is signaled is described with reference to Tables 19 to 24.

Specifically, in Tables 19, 21, and 23, the flag (e.g., layer_dependency_vps_flag) indicating whether the reference layers signaled in the video parameter set are used likewise in the slice is signaled in the slice header, and the flag is "1," the reference layer information signaled in the video parameter set is used, and in case the flag is "0," the reference layers are described and signaled in the slice header.

In the embodiment according to Tables 20, 22, and 24, only when the number (e.g., slice_num_direct_ref_layers) of the reference layers of the slice to be currently encoded is not the same as the number of reference layers that may be referenced by the same layers as the current encoding target layer signaled in the video parameter set, the reference layers are signaled.

TABLE 19

| slice_segment_header( ) { | Descriptor |
|---|---|
|     ... | |
| if( nuh_layer_id > 0 && | |
| NumDirectRefLayers[ nuh_layer_id ] > 0 ) { | |
|     inter_layer_pred_enabled_flag | u(1) |
|     if (inter_layer_pred_enabled_flag){ | |
|       layer_dependency_vps_flag | |
|       if (layer_dependency_vps_flag){ | |
|         if( !max_one_active_ref_layer_flag ) | |
|           slice_num_direct_ref_layers | u(v) |
|         for(i = 0; i < NumActiveRefLayerPics; i++ ) | |
|           ref_layer_idx[i] | u(v) |
|       } | |
|     } | |
| } | |
| } | |

Referring to Table 19, inter_layer_pred_enabled_flag being "1" specifies that the picture uses inter-layer prediction, and inter_layer_pred_enabled_flag being "0" specifies that the picture does not use inter-layer prediction.

layer_dependency_vps_flag specifies whether reference layer information is signaled in the slice header (slice segment header). Layer_dependency_vps_flag being "0" specifies that reference layer information is signaled in the slice header, and layer_dependency_vps_flag being "1" specifies that the reference layer information is not signaled in the slice segment header but reference layer information signaled in the VPS extension is used as reference layer information of the picture.

slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers [nuh_layer_id]) that are referenced by layers having the same layer_id (i.e., nuh_layer_id) as the picture signaled in the video parameter set. In case max_one_active_ref_layer_flag is "1," NumActiveRefLayerPics=1 (NumActiveRefLayerPics=slice_num_driect_ref_layers), so that slice_num_direct_ref_layers is not signaled.

ref_layer_idx[i] specifies the index (with respect to the index described in the video parameter set) of the ith reference layer directly referenced by the picture.

TABLE 20

| slice_segment_header( ){ | Descriptor |
|---|---|
| ... | |
| if( nuh_layer_id > 0 && | |
| NumDirectRefLayers[ nuh_layer_id ] > 0 ) { | |
|   inter_layer_pred_enabled_flag | u(1) |
|   if (inter_layer_pred_enabled_flag){ | |
|     if( !max_one_active_ref_layer_flag ) | |
|       slice_num_direct_ref_layers | u(v) |
|     if(NumDirectRefLayers[nuh_layer_id] != | |
|     NumActiveRefLayerPics) | |
|       for(i = 0; i < NumActiveRefLayerPics; i++ ) | |
|         ref_layer_idx[i] | u(v) |
|   } | |
| } | |
| } | |

Referring to Table 20, inter_layer_pred_enabled_flag being "1" specifies that the picture uses inter-layer prediction, and inter_layer_pred_enabled_flag being "0" specifies that the picture does not use inter-layer prediction.

slice_num_direct_ref_layers specifies the number of reference layers that are directly referenced by an picture. The number of reference layers specified by slice_num_direct_ref_layers is supposed to be the equal or smaller than the number of reference layers (i.e., NumDirectRefLayers [nuh_layer_id]) that are referenced by layers having the same layer_id (i.e., nuh_layer_id) as the picture signaled in the video parameter set. In case NumDirectRefLayers [nuh_layer_id] is the same as slice_num_direct_ref_layers, the reference layer information signaled in the VPS extension is used as the reference layer information of the picture, and in case NumDirectRefLayers[nuh_layer_id] is not the same as slice_num_direct_ref_layers, the reference layer information signaled in the slice segment header is used as the reference layer information of the picture.

ref_layer_idx[i] specifies the index (with respect to the index described in the video parameter set) of the ith reference layer directly referenced by the picture.

TABLE 21

| slice_segment_header( ) { | Descriptor |
|---|---|
| ... | |
| if( nuh_layer_id > 0 && | |
| NumDirectRefLayers[ nuh_layer_id ] > 0 ) { | |

TABLE 21-continued

| slice_segment_header( ) { | Descriptor |
|---|---|
|   inter_layer_pred_enabled_flag | u(1) |
|   if (inter_layer_pred_enabled_flag)&& | |
|     NumDirectRefLayers[nuh_layer_id] > 1){ | |
|   layer_dependency_vps_flag | |
|   if (!layer_dependency_vps_flag){ | |
|     if( !max_one_active_ref_layer_flag ) | |
|       slice_num_direct_ref_layers | u(v) |
|     for(i = 0; i < NumActiveRefLayerPics; i++ ) | |
|       ref_layer_idx[i] | u(v) |
|   } | |
| } | |
| } | |
| } | |

Referring to Table 21, inter_layer_pred_enabled_flag being "1" specifies that the picture uses inter-layer prediction, and inter_layer_pred_enabled_flag being "0" specifies that the picture does not use inter-layer prediction.

layer_dependency_vps_flag specifies whether reference layer information is signaled in the slice header (slice segment header). Layer_dependency_vps_flag being "0" specifies that reference layer information is signaled in the slice header, and layer_dependency_vps_flag being "1" specifies that the reference layer information is not signaled in the slice segment header but reference layer information signaled in the VPS extension is used as reference layer information of the picture.

If layer_dependency_vps_flag is "1," slice_num_direct_ref_layers may be the same as NumDirectRefLayers [nuh_layer_id], and ref_layer_idx[i] may be deemed i. In case layer_dependency_vps_flag is not signaled, it may be considered "0." In case max_one_active_ref_layer_flag is "1," layer_dependency_vps_flag may be "0."

slice_num_direct_ref_layers specifies the number of reference layers that are directly referenced by a picture. The number of reference layers specified by slice_num_direct_ref_layers is supposed to be the equal or smaller than the number of reference layers (i.e., NumDirectRefLayers [nuh_layer_id]) that are referenced by layers having the same layer_id (i.e., nuh_layer_id) as the picture signaled in the video parameter set.

In case max_one_active_ref_layer_flag is "1," NumActiveRefLayerPics=1 (NumActiveRefLayerPics=slice_num_driect_ref_layers), so that slice_num_direct_ref_layers is not signaled.

ref_layer_idx[i] specifies the index (with respect to the index described in the video parameter set) of the ith reference layer directly referenced by the picture.

TABLE 22

| slice_segment_header( ) { | Descriptor |
|---|---|
| ... | |
| if( nuh_layer_id > 0 && | |
| NumDirectRefLayers[ nuh_layer_id ] > 0 ) { | |
|   inter_layer_pred_enabled_flag | u(1) |
|   if (inter_layer_pred_enabled_flag && | |
|     NumDirectRefLayers[nuh_layer_id] > 1){ | |
|     if( !max_one_active_ref_layer_flag ) | |
|       slice_num_direct_ref_layers | u(v) |
|     if(NumDirectRefLayers[nuh_layer_id] != | |
|     NumActiveRefLayerPics) | |
|       for(i = 0; i < NumActiveRefLayerPics; i++ ) | |
|         ref_layer_idx[i] | u(v) |
|   } | |
| } | |
| } | |

Referring to Table 22, inter_layer_pred_enabled_flag being "1" specifies that the picture uses inter-layer prediction, and inter_layer_pred_enabled_flag being "0" specifies that the picture does not use inter-layer prediction.

slice_num_direct_ref_layers may denote the number of reference layers directly referenced b y the pictureor the number of layer reference pictures used for inter-layer prediction of an picture. The number of reference layers or the number of layer reference pictures specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set. In case NumDirectRefLayers[nuh_layer_id] is the same as slice_num_direct_ref_layers, the reference layer information signaled in the VPS extension is used as the reference layer information of the picture, and in case NumDirectRefLayers[nuh_layer_id] is not the same as slice_num_direct_ref_layers, the reference layer information signaled in the slice segment header is used as the reference layer information of the picture.

ref_layer_idx[i] specifies the index (with respect to the index described in the video parameter set) of the ith reference layer directly referenced by the picture.

NumDirectRefLayers[nuh_layer_id] of Table 22 may be derived based on the layer-dependency information received in the video parameter set extension. The layer-dependency information may be signaled in a syntax element, direct_dependency_flag[i][j], and indicates whether the layer having the ith index in the entire bit stream directly references the jth layer. By such layer-dependency information, information on the reference layer referenced by the ith layer in the entire bit stream may be obtained.

In other words, the number of reference layers that may be referenced in the whole bit stream by the current layer through flag information (layer information) such as direct_dependency_flag[i][j] can be derived.

If nuh_layer_id of the current layer is larger than 0, that is, if the current layer is not a base layer and the number of reference layers obtained is greater than 0, flag information (inter_layer_pred_enabled_flag) indicating whether inter-layer prediction is used for decoding a current picture in the current layer is received.

If inter_layer_pred_enabled_flag is 1, NumDirectRefLayers[nuh_layer_id] is greater than 1 (NumDirectRefLayers[nuh_layer_id]>1), and all of the layers included in the entire bit stream do not reference one reference layer (!max_one_active_ref_layer_flag), then information on the number of reference pictures (slice_num_direct_ref_layers) that may specify the number of reference pictures that may be used for inter-layer prediction of the current picture is received. Hereinafter, the reference picture that may be used for inter-layer prediction is referred to as inter layer reference picture, and information that may specify the number of inter layer reference pictures is referred to as inter layer reference picture count information.

If the number of reference layers referenced by the layer to which the current picture belongs is at most one, the number of layers referenced by the current picture is also one.

The inter layer reference picture count information may also be signaled in a syntax element such as num_inter_layer_ref_pics_minus1.

The number of inter layer reference pictures (NumActiveRefLayerPics) may be specified as the value of inter layer reference picture information (in case of slice_num_direct_ref_layers) signaled, or as the inter layer reference picture count information plus 1 (in case of num_inter_layer_ref_pics_minus1).

If the number of reference layers (NumDirecRefLayers[nuh_layer_id]) is not the same as the number of inter layer reference pictures (NumActiveRefLayerPics), (NumDirectRefLayers[ nuh_layer_id]!=NumActiveRefLayerPics), layer information (ref_layer_idx [i]) on the reference layer referenced by the current picture among the reference layers is received.

The layer information may be information on an ID of the layer of the reference picture that may be referenced by the current picture.

TABLE 23

| slice_segment_header( ) { | Descriptor |
|---|---|
| ... | |
| if( nuh_layer_id > 0 &&  | |
|   NumDirectRefLayers[ nuh_layer_id ] > 0 ) { | |
|     inter_layer_pred_enabled_flag | u(1) |
|   if (inter_layer_pred_enabled_flag){ | |
|     layer_dependency_vps_flag | |
|     if (!layer_dependency_vps_flag){ | |
|       if( !max_one_active_ref_layer_flag ) | |
|         slice_num_direct_ref_layers | u(v) |
|       for(i = 0; i < NumActiveRefLayerPics; i++ ) | |
|         ref_layer_idx_delta[i] | u(v) |
|     } | |
|   } | |
| } | |
| } | |

Referring to Table 23, inter_layer_pred_enabled_flag being "1" specifies that the picture uses inter-layer prediction, and inter_layer_pred_enabled_flag being "0" specifies that the picture does not use inter-layer prediction.

layer_dependency_vps_flag specifies whether reference layer information is signaled in the slice header (slice segment header). Layer_dependency_vps_flag being "0" specifies that reference layer information is signaled in the slice header, and layer_dependency_vps_flag being "1" specifies that the reference layer information is not signaled in the slice segment header but reference layer information signaled in the VPS extension is used as reference layer information of the picture.

slice_num_direct_ref_layers specifies the number of reference layers that are directly referenced by an picture. The number of reference layers specified by slice_num_direct_ref_layers is supposed to be the equal or smaller than the number of reference layers (i.e., NumDirectRefLayers[nuh_layer_id]) that are referenced by layers having the same layer_id (i.e., nuh_layer_id) as the picture signaled in the video parameter set.

In case max_one_active_ref_layer_flag is "1," NumActiveRefLayerPics=1 (NumActiveRefLayerPics=slice_num_driect_ref_layers), so that slice_num_direct_ref_layers is not signaled.

ref_layer_idx delta[j] specifies a difference between the index (with respect to the index described in the video parameter set) of the jth reference layer directly referenced by the picture and the index (with respect to the index described in the video parameter set) of the j−1th reference layer. ref_layer_idx delta[0] specifies the index of the $0^{th}$ reference layer.

TABLE 24

| slice_segment_header( ) { | Descriptor |
|---|---|
| ... | |
| if( nuh_layer_id > 0 && | |
| NumDirectRefLayers[ nuh_layer_id ] > 0 ) { | |
|     inter_layer_pred_enabled_flag | u(1) |
|     if (inter_layer_pred_enabled_flag){ | |
|         if( !max_one_active_ref_layer_flag ) | |
|             slice_num_direct_ref_layers | u(v) |
|         if(NumDirectRefLayers[nuh_layer_id] != | |
|         NumActiveRefLayerPics) | |
|             for(i = 0; i < NumActiveRefLayerPics; i++ ) | |
|                 ref_layer_idx_delta[i] | u(v) |
|     } | |
|   } | |
| } | |

Referring to Table 24, inter_layer_pred_enabled_flag being "1" specifies that the picture uses inter-layer prediction, and inter_layer_pred_enabled_flag being "0" specifies that the picture does not use inter-layer prediction.

slice_num_direct_ref_layers specifies the number of reference layers that are directly referenced by an picture. The number of reference layers specified by slice_num_direct_ref_layers is supposed to be the equal or smaller than the number of reference layers (i.e., NumDirectRefLayers [nuh_layer_id]) that are referenced by layers having the same layer_id (i.e., nuh_layer_id) as the picture signaled in the video parameter set. In case NumDirectRefLayers [nuh_layer_id] is the same as slice_num_direct_ref_layers, the reference layer information signaled in the VPS extension is used as the reference layer information of the picture, and in case NumDirectRefLayers[nuh_layer_id] is not the same as slice_num_direct_ref_layers, the reference layer information signaled in the slice segment header is used as the reference layer information of the picture.

ref_layer_idx delta[j] specifies a difference between the index (with respect to the index described in the video parameter set) of the jth reference layer directly referenced by the picture and the index (with respect to the index described in the video parameter set) of the j–1th reference layer. ref_layer_idx delta[0] specifies the index of the 0$^{th}$ reference layer.

At this time, the layers that may be referenced by the slice described in the slice header upon encoding may be a sub-set of reference layers that may be referenced by the same layers as the current encoding target layer in the entire bit stream.

For example, the reference layers signaled in the slice header may be a sub-set of the reference layer list that may be referenced by the same layers as the current encoding target layer signaled in the video parameter set.

Turning back to FIG. 5, the encoding apparatus that has configured a list of layers that may be referenced by the picture of the current encoding target layer configures a reference picture set including the reconstructed picture of the reference layer that may be referenced by the target layer for inter-prediction of the current encoding target picture and performs reference picture marking (S520).

At this time, the encoding apparatus identifies whether the reconstructed picture constituted of the picture included in the reference layer list is available, and if available, includes the reconstructed picture in the reference picture set, and if unavailable, may mark the reconstructed picture as "no reference picture."

The reference picture set constituted of the pictures included in the reference layer list (hereinafter, first set) is marked as "used for long term reference" and may be thus treated as long-term reference picture(s) upon inter-prediction of the current encoding target picture.

There may be various types of reference picture sets for inter-prediction, constituted of pictures of the same layer as the current encoding target layer, other than the first set, i.e., the reference picture set constituted of pictures included in the reference layer list.

The reference picture set for inter-prediction may include a short-term reference picture (second set) that is used for inter-prediction of the current encoding target picture and is displayed earlier than the current encoding target picture, a short-term reference picture (third set) that is used for inter-prediction of the current encoding target picture and is displayed later than the current encoding target picture, a long-term reference picture for inter-prediction of the current encoding target picture, a short-term reference picture (fifth set) for an picture that may be encoded after the current encoding target picture, and a long-term reference picture (sixth set) for an picture that may be encoded after the current encoding target picture.

Thereafter, the encoding apparatus generates a reference picture list according to the reference picture set and the reference picture type (S530).

The encoding apparatus may generate a reference picture list of the current encoding target picture according to the characteristics of the reference picture set and reference picture type based on various reference picture sets as described above.

By way of example, the encoding apparatus may add the reference picture set configured as the reference layer list generated in step S520 to the inter-frame reference picture lists L0 and L1 constituted of reference picture sets having the pictures of same layer as the current encoding target layer, thereby generating a final reference picture list.

In this case, the encoding apparatus may add the reconstructed picture of the reference layer to a fixed position whenever generating a reference picture list or may generate a reference picture list and then additionally vary the position of the reconstructed picture of the reference layer in order for efficient encoding.

In the case of adding the reconstructed picture of the reference layer to the fixed position whenever generating a reference picture list, upon generating list L0, the first set may be added to the last or first (ref_idx=0) or second (ref_idx=1) position.

In case the the reconstructed picture of reference layer is added to a middle position in list L0, the index in the list of the pictures located at the position and its subsequent positions may be increased by the number of added reference layers (the number of reference pictures constituted of reference layer list).

Or, the encoding apparatus, upon generating list L0, may replace as many reference pictures as the number of reference pictures constituted of reference layer list from the first (ref_idx=0) or second (ref_idx=1) position with the first set. The encoding apparatus may add the first set from any signaled position upon generating list L0. In case the first set is added to a middle position in the list, the index in the list of the images located in the corresponding position or its subsequent positions may be increased by the number of added reference layers (the number of reference pictures constituted of reference layer list).

Or, the encoding apparatus may replace as many reference pictures as the number of reference pictures constituted of reference layer list from any signaled position upon generating list L0 with the first set.

Or, the encoding apparatus, upon generating list L0, may add each picture included in the reference layer list of the first set to any different positions from each other. At this time, the encoding apparatus may increase the index in the list of the pictures located at the position of the added pictures and their subsequent positions by the number of added reference layers (the number of reference pictures constituted of reference layer list).

Or, the encoding apparatus, upon generating list L0, may replace reference pictures located at any different positions from each other with each picture included in the reference layer list of the first set.

Or, the encoding apparatus, upon generating list L1, may add the first set to the last or first (ref_idx=0) or second (ref_idx=1) position.

In case a reference layer is added to a middle position of list L1, the encoding apparatus may increase the index in the list of the images located at the position and its subsequent positions by the number of added reference layers (the number of reference pictures constituted of reference layer list).

Or, the encoding apparatus, upon generating list L1, may replace as many reference pictures as the number of reference pictures constituted of reference layer list from the first (ref_idx=0) or second (ref_idx=1) position, with the first set.

The encoding apparatus, upon generating list L1, may add the first set to any signaled position and its subsequent positions. In case the first set is added to a middle position in the list, the index in the list of the pictures that are located at the position and its subsequent positions may be increased by the number of added reference layers (the number of reference pictures constituted of reference layer list).

Or, the encoding apparatus, upon generating list L1, may replace as many reference pictures as the number of reference pictures constituted of reference layer list from any signaled position with the first set.

Or, the encoding apparatus, upon generating list L1, may add each picture included in the reference layer list of the first set to any different positions from each other. At this time, the encoding apparatus may increase the index in the list of the images that are located at the position of the added pictrues and its subsequent positions by the number of added reference layers (the number of reference pictures constituted of reference layer list).

Or, the encoding apparatus, upon generating list L1, may replace the reference pictures that are located at any different positions from each other with each picture included in the reference layer list of the first set.

Meanwhile, in case, after the reference layer list is generated, the position of the reconstructed picture of the reference layer is additionally changed for efficient encoding, the position of the reconstructed picture of the reference layer may be varied at whatever position in the reference layer list by using an encoding parameter that may be included in the slice header or picture parameter set.

If the reference layer list is generated, the encoding apparatus may conduct motion estimation and motion compensation on the current encoding target picture using the reference picture in the reference picture list (S540).

The encoding apparatus may conduct motion estimation and motion compensation on the current encoding target picture using the reference picture in the reference picture list by a conventional inter prediction method.

Figure 6:
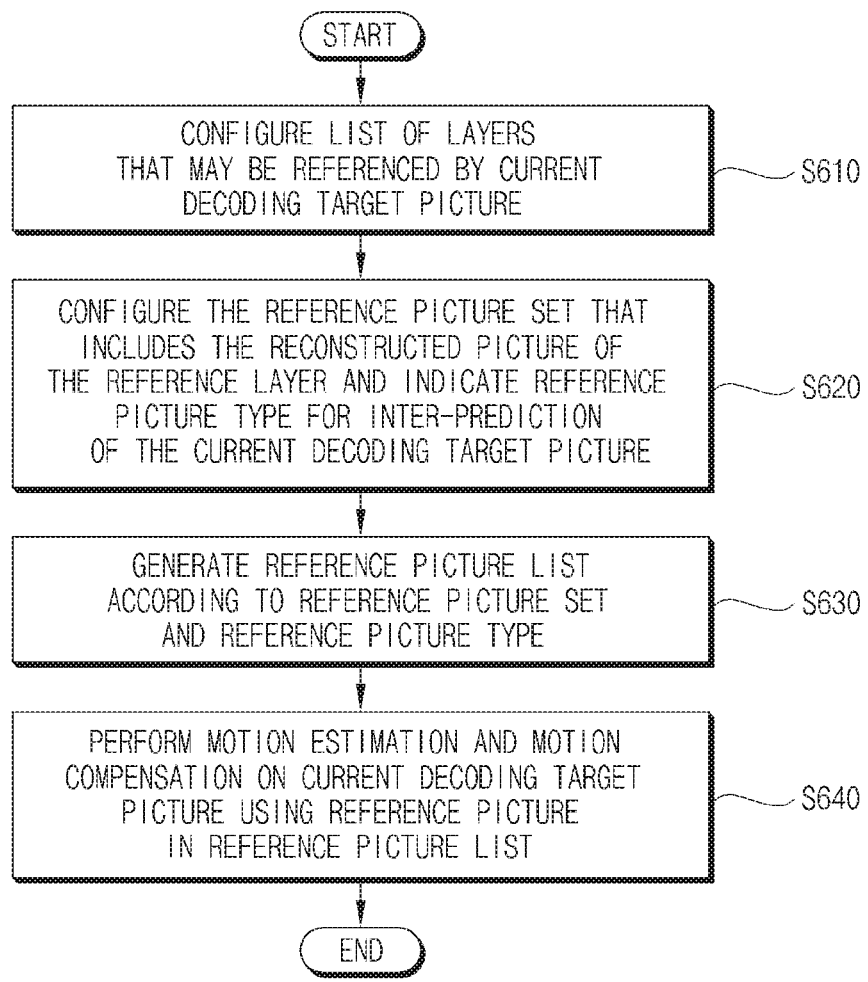
FIG. 6 is a flowchart illustrating a method of performing upper layer decoding in a decoding apparatus according to an embodiment of the present invention.

FIG. 6 is a flowchart illustrating a method of conducting upper layer decoding in a decoding apparatus according to an embodiment of the present invention. The decoding apparatus according to the present invention supports at least one or more scalabilities (for example, spatial, quality, and view scalabilities) and conducts upper layer decoding in the video architecture supporting a multi-layer structure.

Referring to FIG. 6, the decoding apparatus first configures a list of layers that may be referenced by a current decoding target picture (S610).

If a bit stream supports at least one or more scalabilities (for example, spatial, quality, and view scalabilities), the decoding apparatus according to an embodiment of the present invention may configure a reference layer list for at least one or more layers. The reference layer lists thusly configured may be used for decoding the current decoding target picture.

The decoding apparatus may configure a reference layer list as follows, using the reference layer information of the current decoding target layer that is signaled, included in the video parameter set.

According to an embodiment of the present invention, the decoding apparatus may configure a reference layer list that may be referenced by the same layers as the current decoding target layer in the entire bit stream. The reference layer list may be used for reconstructed pictures that belong to the same layer as the layer to which the current decoding target picture belongs, and may be configured based on the reference layer information of the current decoding target layer that is signaled in the video parameter set.

For example, the decoding apparatus may configure a reference layer list of reference layers (ref_layer_id) of the layer having the same nuh_layer_id value as the layer to which the current decoding target picture belongs, among the nuh_layer_id[i] values signaled, as shown in Table 1.

In configuring a reference layer list using the signaled reference layer information, the order of the reference layers in the list may be determined by one of the following methods.

First, the reference layers may be configured in the order signaled in Tables 1 and 2.

Or, the decoding apparatus may configure a reference layer list in ascending order from the layer having the smallest difference in layer_id from the decoding target layer (that is, closest layer).

Or, the decoding apparatus may configure a spatial quality reference layer list in descending order from the layer having the highest priority.

At this time, the priority-related information may be signaled in an NAL unit header or video parameter set.

Or, the decoding apparatus may configure a spatial quality reference layer list in ascending order from the layer having the smallest difference in spatial resolution from the current decoding target layer among the reference layers having the same view as the current decoding target layer.

At this time, when having the same spatial resolution, the quality reference layers may be configured in ascending order from the layer having the smallest difference in layer_id from the current decoding target layer (that is, closest layer).

Additionally, the layers may be included in the reference layer list in the order away from the view closest to the view of the current decoding target layer. When having the same view, the reference layers may be included in the reference layer list in the same way as does on the layers having the same view as the current decoding target layer.

For example, in the bit stream architecture as shown in FIG. 4, the reference layer list of layers with n as their layer_id's may be configured in the order of the layers whose layer_id's are n-1, n-2, n-3, n-4, n-5, n-6, n-7, n-8, n-9, n-10, and n-11.

Or, among the layers having the same view as the current decoding target layer, the layers may be configured in ascending order from the layer having the smallest difference in spatial resolution from the current decoding target layer. At this time, when having the same spatial resolution, the quality reference layers may be configured in ascending order from the layer having the lowest quantization parameter to be decoded (that is, in descending order from the layer having the best quality, upon decoding).

Additionally, the layers may be included in the reference layer list in the order away from the view closest to the view of the current decoding target layer, and when having the same view, the layers may be included in the reference layer list in the same way as does on the layers having the same view as the current decoding target layer as described above.

According to another embodiment of the present invention, the decoding apparatus may configure a reference layer list that may be referenced by the current decoding target layer (or slice) of a picture to be currently decoded, and configured reference layer lists may be used for decoding the current decoding target picture.

The decoding apparatus may configure a reference layer list using reference layer information signaled in the slice header of the current decoding target layer. Even when the current decoding target picture is constituted of one or more slices, the same reference layer information may be signaled in the slice header, and the slices may have different reference layer information from each other.

The decoding apparatus may configure a reference layer list of reference layers based on the information signaled according to any one of Tables 3 to 24.

At this time, the reference layers signaled in the slice header may be a sub-set of reference layers that may be referenced by the same layers as the current decoding target layer in the entire bit stream.

For example, the reference layers signaled in the slice header may be a sub-set of the reference layer list that may be referenced by the same layers as the current decoding target layer signaled in the video parameter set.

In configuring a reference layer list using the reference layer information (ref_layer_id) signaled or derived by utilizing signaled information, the order of the reference layers in the reference layer list may be configured in various ways, as follows.

First, the decoding apparatus may add the reference layers in the reference layer list in the order signaled according to any one of Tables 3 to 24.

Or, the decoding apparatus may configure a spatial quality reference layer list in ascending order from the layer having the smallest difference in layer_id of the reference layer from the decoding target layer (that is, the closest layer).

Or, the reference layer list may be configured in descending order from the layer having the highest priority among the reference layers.

At this time, the priority-related information may be signaled, included in an NAL unit header or video parameter set.

Or, when having the same view as the current decoding target layer, the reference layer list may be configured in ascending order from the layer having the smallest difference in spatial resolution from the current decoding target layer. At this time, when having the same spatial resolution, the quality reference layers may be configured in ascending order from the layer having the smallest difference in layer_id from the current decoding target layer (that is, the closest layer).

In such case, additionally, the layers may be included in the reference layer list in the order away from the closest view to the view of the current decoding target layer, and when having the same view, the layers may be included in the reference layer list in the same way as does on the layers having the same view as the current decoding target layer as described above.

For example, in the bit stream architecture as shown in FIG. 4, the reference layer list of the layers whose layer_id's are n may be configured in the order of the layers whose layer_id's are n-1, n-2, n-3, n-4, n-5, n-6, n-7, n-8, n-9, n-10, and n-11.

Or, among the layers having the same view as the current decoding target layer, the reference layer list may be configured in ascending order from the layer having the smallest difference in spatial resolution from the current decoding target layer. At this time, when having the same spatial resolution, the quality reference layers may be configured in ascending order from the lowest quantization parameter to be decoded (that is, in descending order from the layer having the best quality, upon decoding).

In such case, additionally, the layers may be included in the reference layer list in the order away from the closest view to the view of the current decoding target layer, and when having the same view, the layers may be included in the reference layer list in the same way as does on the layers having the same view as the current decoding target layer as described above. The configured reference layer list may be used for decoding the slice.

The maximum number of layers that may be referenced may be limited with respect to the entire bit stream, and this may be signaled in, e.g., video parameter set, sequence parameter set, or slice header, and a limit may be put according to a profile or level.

The decoding apparatus, in case there is an additional signaling on the configured reference layer list (for example, higher level signaling such as slice header), may vary the order in the list according to what is expressed by the signaling.

Next, the decoding apparatus configures the reference picture set that includes the reconstructed picture of the reference layer and indicates reference picture type for inter-prediction of the current decoding target picture (S620).

The decoding apparatus may configure the reference picture set including the reconstructed picture of the reference layer and mark reference picture type for inter-prediction of the current decoding target picture.

That is, the decoding apparatus configures a reference picture set (first set) constituted of pictures included in the reference layer list. At this time, whether the pictures included in the reference layer list are available as a reconstructed picture is verified, and if available, the reconstructed picture is included in the reference picture set, and if unavailable, the reconstructed picture may be marked with "no reference picture."

The first set may be marked as "used for long term reference" so that it can be treated as a long-term reference picture upon inter-prediction of the current decoding target picture.

The decoding apparatus may configure various reference picture sets as follows, in addition to the reference picture set constituted of the pictrues included in the first set, i.e., the reference layer list.

The reference picture sets are used for inter-prediction of the current decoding target picture, and may include at least one of a short-term reference picture (second set) that is used for inter-prediction of the current decoding target picture and is displayed earlier than the current decoding target picture, a short-term reference picture (third set) that is used for inter-prediction of the current decoding target picture and is displayed after the current decoding target picture, a long-term reference picture (fourth set) that is used for inter-prediction of the current decoding target picture, a short-term reference picture for a picture that may be decoded after the current decoding target picture, and a long-term reference picture (sixth set) for a picture that may be decoded after the current decoding target picture.

Thereafter, the decoding apparatus generates a reference picture list according to the reference picture set and reference picture type (S630).

The decoding apparatus may generate a reference picture list of the current decoding target picture according to the reference picture set and reference picture type. That is, the decoding apparatus may generate a reference picture list by combining the first set with the second set to the fourth set.

For example, when generating a reference picture list of the current decoding target picture, the decoding apparatus may generate a final reference picture list by adding the reference picture set constituted of the reference picture list included in the first set to inter-frame reference picture lists L0 and L1 constituted of reference picture sets including the pictures of the same layer as the current decoding target picture.

In such case, when generating a reference picture list, the reconstructed picture of the reference layer may be added to a fixed position, and the position of the reconstructed picture of the reference layer may be varied for efficient encoding.

In case the reconstructed picture of the reference layer is added to a fixed position whenever generating a reference picture list, when generating list L0, the first set may be added from the last or first (ref_idx=0) or second (ref_idx=1) position.

In case the reference layer is added to a middle position in list L0, the index in the list of the pictures located at the position or its subsequent positions may be increased by the number of reference layers (the number of reference pictures constituted of reference layer list).

Or, the decoding apparatus, upon generating list L0, may replace as many reference pictures as the number of reference pictures constituted of reference layer list with the first set from the first (ref_idx=0) or second (ref_idx=1) position.

Or, the decoding apparatus, upon generating list L0, may add the first set from any signaled position. At this time, in case the first set is added to a middle position of the list, the index in the list of the pictures located at the position or its subsequent positions may be increased by the number of added reference layers (the number of reference pictures constituted of reference layer list).

The decoding apparatus, upon generating list L0, may replace as many reference pictures as the number of reference pictures constituted of reference layer lists with the first set, from any signaled position.

The decoding apparatus, upon generating list L0, may add each picture included in the first set to any different positions from each other. At this time, the index in the list of the pictures located at the position and its subsequent positions may be increased by the number of added reference layers (the number of reference pictures constituted of reference layer list).

The decoding apparatus, upon generating list L0, may replace the reference pictures located at any different positions from each other with each picture included in the first set.

Or, the decoding apparatus, upon generating list L1, may add the first set to the last or first (ref_idx=0) or second (ref_idx=1) position.

In case the reference layer is added to a middle position in list L1, the index in the list of the pictures located at the position or its subsequent positions may be increased by the number of added reference layers (the number of reference pictures constituted of reference layer list).

Or, the decoding apparatus, upon generating list L1, may replace as many reference pictures as the number of reference pictures constituted of reference layer list with the first set from the first (ref_idx=0) or second (ref_idx=1).

The decoding apparatus, upon generating list L1, may add the first set from any signaled position. At this time, in case the first set is added to a middle position in the list, the index in the list of the pictures located at the position and its subsequent positions may be increased by the number of added reference layers (the number of reference pictures constituted of reference layer list).

The decoding apparatus, upon generating list L1, may replace as many reference pictures as the number of reference pictures constituted of reference layer list with the first set from any signaled position.

The decoding apparatus, upon generating list L1, may add each picture included in the first set to any different positions from each other. At this time, the index in the list of the pictures located at the position and its subsequent positions may be increased by the number of added reference layers (the number of reference pictures constituted of reference layer list).

The decoding apparatus, upon generating list L1, may replace the reference pictures located at any different positions from each other with each picture included in the first set.

Meanwhile, in case the position of the reconstructed picture of the reference layer is varied for additional efficient encoding after generating the reference picture list, an encoding parameter that may be included in the slice header or picture parameter set may be used to vary the position of the reconstructed picture of the reference layer to whatever position.

If the reference layer list is generated, the reference picture in the reference picture list may be used to perform motion estimation and motion compensation on the current decoding target picture (S640).

In case the current decoding target block of the current layer is subjected to inter-prediction, the decoding apparatus may conduct motion compensation on the current decoding target block using the reference picture in the reference picture list.

Figure 7:
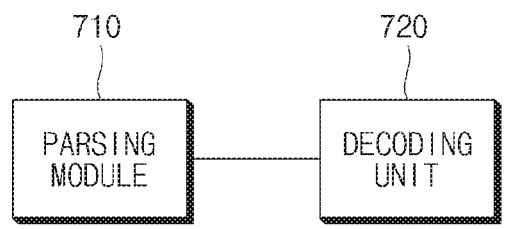
FIG. 7 is a block diagram illustrating a picture decoding apparatus according to an embodiment of the present invention.

FIG. 7 is a block diagram illustrating a picture decoding apparatus according to an embodiment of the present invention.

As illustrated, the decoding apparatus includes a parsing module 710 for parsing picture information and a decoding unit 720 for predicting a current picture using the picture information.

The parsing module 710 receives and parses layer-dependency information on a reference layer that may be referenced by the current layer in an entire bit stream, and in case inter-layer prediction is used for decoding a current picture in the current layer, receives and parses layer information on a reference layer referenced by the current picture of the reference layer.

The layer-dependency information may be received, included in a video parameter set extension.

Meanwhile, the layer information on the reference layer referenced by the current picture is information on an ID of the layer of the reference picture that may be referenced by the current picture, and the layer information may be included in the slice header.

At this time, the number of reference layers that may be referenced by the current layer in the entire bit stream may be derived based on the layer-dependency information.

The parsing module 710, if the derived number of reference layers is greater than 0, may receive and parse flag information indicating whether inter-layer prediction is used for decoding the current picture in the current layer.

If the flag information is 1, the number of reference layers is greater than 1, and all of the layers included in the entire bit stream do not use one reference layer, the parsing module 710 may receive and parse information on the number of inter layer reference pictures that may specify the number of inter layer reference pictures that may be used for inter-layer prediction of the current picture.

The number of inter layer reference pictures may be specified as information on the number of inter layer reference pictures plus one. That is, the information on the number of inter layer reference pictures may be signaled as the number of inter layer reference pictures minus one.

At this time, the layer information may be received only when the number of reference layers is not the same as the number of inter layer reference pictures.

The decoding unit 720 may decode the current picture based on the layer information.

Figure 8:
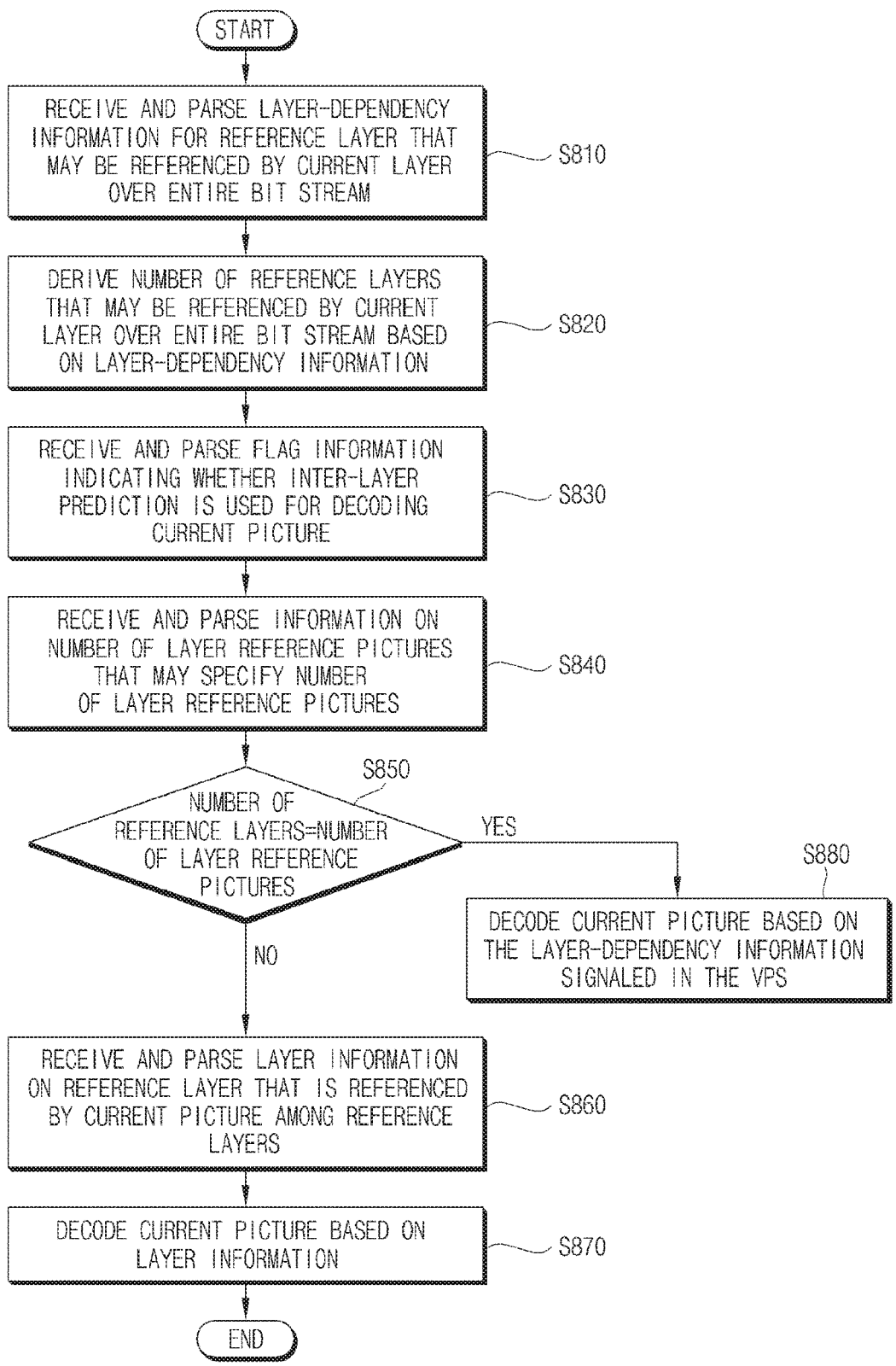
FIG. 8 is a flowchart illustrating a decoding method of a picture decoding apparatus according to an embodiment of the present invention.

FIG. 8 is a flowchart illustrating a decoding method of a picture decoding apparatus according to an embodiment of the present invention.

First, the decoding apparatus receives and parses layer-dependency information on a reference layer that may be referenced by a current layer in an entire bit stream (S810).

The layer-dependency information may be received, included in a video parameter set extension.

Thereafter, the decoding apparatus obtains the number of reference layers that may be referenced by the current layer in the entire bit stream based on the layer-dependency information (S820).

If the number of reference layers is greater than 0, the decoding apparatus may receive and parse flag information indicating whether inter-layer prediction is used for decoding the current picture in the current layer (S830).

If the flag information is 1, the number of reference layers is greater than 1, and all of the layers included in the entire bit stream do not use at most one reference layer, the decoding apparatus may receive and parse information on the number of inter layer reference pictures that may specify the number of inter layer reference pictures that may be used for inter-layer prediction of the current picture (S840).

The number of inter layer reference pictures may be specified with a value of the inter layer reference picture information signaled or may be specified as the information on the number of inter layer reference pictures plus one.

If the number of reference layers derived in step S820 is not the same as the number of inter layer reference pictures identified in step S840 (S850), the decoding apparatus receives and parses layer information on the reference layer referenced by the current picture among the reference layers (S860).

That is, the decoding apparatus receives layer information when inter-layer prediction is used for decoding the current picture in the current layer and the above conditions are met.

The layer information may be information on an ID of the layer of the reference picture that may be referenced by the current picture and may be received, included in the slice header in the bit stream.

If the layer information is obtained, the decoding apparatus decodes the current picture based on the layer information (S870).

Meanwhile, if the number of reference layers is the same as the number of inter layer reference pictures, the current picture is decoded based on the layer-dependency information signaled in the VPS (S880).

As such, according to the present invention, there are provided an picture encoding/decoding method and an apparatus using the same, which may enhance encoding/decoding efficiency by efficiently generating and managing a reference picture list including one or more reference layers.

Further, there are a picture encoding/decoding method and an apparatus using the same that may adjust the position of the reconstructed picture of the reference layers in the reference picture list and order between reference layer reconstructed picutres upon generating a reference picture list.

Although in the embodiments the methods are described based on flowcharts with a series of steps or blocks, the present invention is not limited to the order, and some steps may be performed simultaneously with or in a different sequence from other steps. Further, it may be understood by those skilled in the art that other steps may be non-exclusively included in the steps of the flowcharts or one or more steps may be removed from the flowcharts without affecting the scope of the present invention.

The above-described embodiments include various aspects of examples. Although all possible combinations of the various aspects of examples may be not described herein, it will be understood by those skilled in the art that such combinations are possible. Accordingly, the present invention includes all other modifications, variations, or changes that may be made to the appending claims.

What is claimed is:

1. A picture decoding method supporting a plurality of layers, the method comprising:
receiving and parsing layer-dependency information, the layer-dependency information being specified for a pair of a first layer and a second layer and indicating whether or not the first layer is a reference layer of the second layer;
deriving the number of layers that may be referenced in the entire bit stream by the current layer based on the layer-dependency information;
if the number of layers is greater than 0, receiving and parsing flag information indicating whether inter-layer prediction may be used for decoding the current picture in the current layer;
if the flag information is 1 and the number of layers is greater than 1, receiving and parsing inter layer reference picture count information that may specify the number of pictures that may be used for the inter-layer prediction of the current picture;
if the number of layers is not the same as the number of pictures, receiving and parsing layer information specifying a layer of a picture that may be referenced by the current picture among reference layers that are derived based on the layer-dependency information; and
performing the inter-layer prediction based on the layer information, wherein the layer information is information on an ID of the layer of the picture that may be referenced by the current picture, and the layer information is received, included in a slice header.

2. The picture decoding method of claim 1, wherein the layer-dependency information is received, included in a video parameter set extension.

3. The picture decoding method of claim 1, if the flag information is 1, the number of layers is greater than 1, and all of the layers included in the entire bit stream do not use at most one reference layer, the receiving and parsing inter layer reference picture count information is performed.

4. The picture decoding method of claim 3, wherein the number of pictures is specified as the inter layer reference picture count information plus one.

5. A picture encoding method supporting a plurality of layers, the method comprising:
    determining and encoding layer-dependency information on whether or not a layer of two layers is a reference layer of other layer of the two layers in an entire bit stream;
    deriving the number of layers that may be referenced in the entire bit stream by the current layer based on the layer-dependency information;
    determining and encoding, if the number of layers is greater than 0, flag information indicating whether inter-layer prediction may be used for decoding the current picture in the current layer;
    determining and encoding, if the flag information is 1 and the number of layers is greater than 1, inter layer reference picture count information that may specify the number of pictures that may be used for the inter-layer prediction of the current picture; and
    determining and encoding, if the number of layers is not the same as the number of pictures, layer information specifying a layer of a picture that may be referenced by the current picture among reference layers that are derived by the layer-dependency information; and
    performing inter-layer prediction based on the layer information.

6. A non-transitory computer readable medium storing a bitstream formed by a picture encoding method supporting a plurality of layers, the method comprising:
    determining and encoding layer-dependency information on whether or not a layer of two layers is a reference layer of other layer of the two layers in an entire bit stream;
    deriving the number of layers that may be referenced in the entire bit stream by the current layer based on the layer-dependency information;
    determining and encoding, if the number of layers is greater than 0, flag information indicating whether inter-layer prediction may be used for decoding the current picture in the current layer;
    determining and encoding, if the flag information is 1 and the number of layers is greater than 1, inter layer reference picture count information that may specify the number of pictures that may be used for the inter-layer prediction of the current picture; and
    determining and encoding, if the number of layers is not the same as the number of pictures, layer information specifying a layer of a picture that may be referenced by the current picture among reference layers that are derived by the layer-dependency information; and
    performing inter-layer prediction based on the layer information.

* * * * *